(12) United States Patent
Lee

(10) Patent No.: US 11,525,959 B2
(45) Date of Patent: Dec. 13, 2022

(54) TUNABLE NANOCIRCUIT AND WAVEGUIDE SYSTEM AND METHOD ON OPTICAL FIBER

(71) Applicant: Baylor University, Waco, TX (US)

(72) Inventor: Ho Wai Howard Lee, Round Rock, TX (US)

(73) Assignee: Baylor University, Waco, TX (US)

(*) Notice: Subject to any disclaimer, the term of this patent is extended or adjusted under 35 U.S.C. 154(b) by 0 days.

(21) Appl. No.: 17/333,762

(22) Filed: May 28, 2021

(65) Prior Publication Data

US 2021/0373242 A1 Dec. 2, 2021

Related U.S. Application Data

(60) Provisional application No. 63/032,050, filed on May 29, 2020.

(51) Int. Cl.
*G02B 6/30* (2006.01)
*G02B 6/27* (2006.01)

(52) U.S. Cl.
CPC ............ *G02B 6/30* (2013.01); *G02B 6/2773* (2013.01)

(58) Field of Classification Search
CPC ........ G02B 6/30; G02B 6/2773; G02B 6/262; G02B 6/1226; G02B 6/02042; G02B 1/002

See application file for complete search history.

(56) References Cited

U.S. PATENT DOCUMENTS

| 8,848,273 B2 | 9/2014 | Yu et al. |
| 9,995,859 B2 | 6/2018 | Kamali et al. |

(Continued)

FOREIGN PATENT DOCUMENTS

| CN | 102610923 A | 7/2012 |
| WO | 2013033591 A1 | 3/2013 |

(Continued)

OTHER PUBLICATIONS

Badsha, M. A., Jun, Y. C., Hwangbo, C. K., "Admittance matching analysis of perfect absorption in unpatterned thin films". Optics Communications, (Jul. 15, 2014), pp. 332, 206-213, vol. 332.

(Continued)

*Primary Examiner* — John Bedtelyon
(74) *Attorney, Agent, or Firm* — Jackson Walker, LLP

(57) ABSTRACT

The present disclosure provides devices, systems, circuits, and effective methods for advanced optical applications using plasmonics and ENZ materials. The disclosure provides for enhancement of the optical tunability of phase and amplitude of propagating plasmons, nonlinear-optical effects, and resonant network in optical fiber tip nanocircuits and integrates the tunable plasmonic and ENZ effects for in-fiber applications to provide optical fiber with high operating speed and low power consumption. The invention yields efficient coupling of a plasmonic functional nanocircuit on the facet of an optical fiber core. The invention also can use gate-tunable ENZ materials to electrically and nonlinear optically tune the plasmonic nanocircuits for advanced light manipulation. The invention efficiently integrates and manipulates the voltage-tuned ENZ resonance for phase and amplitude modulation in optical fiber nanocircuits.

20 Claims, 20 Drawing Sheets

(56) References Cited

U.S. PATENT DOCUMENTS

| | | | |
|---|---|---|---|
| 10,756,503 B2* | 8/2020 | Feigenbaum | H01S 3/06729 |
| 11,022,752 B2* | 6/2021 | Yang | G02B 6/262 |
| 11,137,353 B2* | 10/2021 | Yang | G02B 5/008 |
| 2016/0306079 A1 | 10/2016 | Arbabi et al. | |
| 2016/0341859 A1 | 11/2016 | Shvets et al. | |
| 2016/0349594 A1 | 12/2016 | Wurtz et al. | |
| 2018/0045953 A1 | 2/2018 | Fan et al. | |
| 2019/0033682 A1 | 1/2019 | Kafaie Shirmanesh et al. | |
| 2021/0325241 A1* | 10/2021 | Ohodnicki | G01J 5/0887 |

FOREIGN PATENT DOCUMENTS

| | | |
|---|---|---|
| WO | 2015179834 A1 | 11/2015 |
| WO | 2015187221 A2 | 12/2015 |
| WO | 2016126896 A1 | 8/2016 |
| WO | 2018208774 A1 | 11/2018 |
| WO | 2019118646 A1 | 6/2019 |

OTHER PUBLICATIONS

Powell, D. A., Alu, A., Edwards, B., Vakil, A., Kivshar, Y.S., Engheta, N., "Nonlinear control of tunneling through an epsilon-near-zero channel". Physical Review, (Jun. 29, 2009), 5 pages, vol. B, No. 79.

Gao, S. F., Wang, Y. Y., Liu, X. L., Ding, W., Wang, P., "Bending loss characterization in nodeless hollow-core anti-resonant fiber", Optics Express, (Jun. 27, 2016), pp. 14801-14811, vol. 24, No. 13.

Uebel, P., Gunendi, M. C., Frosz, M. H., Ahmed, G., Edavalath, N. N., Menard, J. M., Russell, P. S., "Broadband robustly single-mode hollow-core PCF by resonant filtering of higher-order modes", Optics Letters, (May 1, 2016), pp. 1961-1964, vol. 41, No. 9.

Wang, Y. Y., Wheeler, N. V., Couny, F., Roberts, p. J., Benabid, F., "Low loss broadband transmission in hypocycloid-core Kagome hollow-core photonic crystal fiber", Optical Letters, (Mar. 1, 2011), pp. 669-671, vol. 36, No. 5.

Scott, G. B., Lacklison, D. E., Ralph, H. L, Page, J. L., "Magnetic Circular-Dichroism and Faraday-Rotation Spectra of Y3fe5o12", Physical Review B, (Oct. 1, 1975), pp. 2562-2571, vol. 12, No. 7.

Bossini, D., Belotelov, V. I., Zvezdin, A. K., Kalish, A. N., Kimel, A. V., "Magnetoplasmonics and Femtosecond Optomagnetism at the Nanoscale", Acs Photonics, (Jun. 1, 2016), pp. 1385-1400 , vol. 3, [online], [retrieved on Oct. 20, 2020], Retrieved from the Internet <https://doi.org/10.1021/acsphotonics.6b00107>.

Armelles, G., Cebollada, A., Garcia-Matin, A., Gonzalez, M. U., "Magnetoplasmonics: Combining Magnetic and Plasmonic Functionalities", Advanced Optical Materials, (2013), pp. 10-35, vol. 1.

Maksymov, I. S., "Magneto-Plasmonics and Resonant Interaction of Light with Dynamic Magnetisation in Metallic and All-Magneto-Dielectric Nanostructures", Nanomaterials-Basel, (Apr. 9, 2015), pp. 577-613, vol. 5.

Belotelov, V. I., Akimov, I. A., Pohl, M., Kotov, V. A., Kasture, S., Vengurlekar, A. S., Gopal, A. V., Yakovlev, D. R., Zvezdin, A. K., Bayer, M., "Enhanced magneto-optical effects in magnetoplasmonic crystals", Nature Nanotechnology, (Jun. 2011), pp. 370-376, vol. 6.

Chin, J. Y., Steinle, T., Wehlus, T., Dregely, D., Weiss, T., Belotelov, V. L, Stritzker, B., Giessen, H., "Nonreciprocal plasmonics enables giant enhancement of thin-film Faraday rotation", Nature Communications, (Mar. 19, 2013), 6 pages, vol. 4, No. 1599.

Grunin, A. A., Zhdanov, A. G., Ezhov, A. A., Ganshina, E. A., Fedyanin, A. A., "Surface-plasmon-induced enhancement of magneto-optical Kerr effect in all-nickel subwavelength nanogratings", Applied Physics Letters, Dec. 30, 2010), 4 pages, vol. 97, No. 261908.

Ctistis, G., Papaioannou, E., Patoka, P., Gutek, J., Fumagalli, P., Giersig, M., "Optical and Magnetic Properties of Hexagonal Arrays of Subwavelength Holes in Optically Thin Cobalt Films", Nano Letters, (Jan. 2009), 6 pages, vol. 9, No. 1, [online], [retrieved on Oct. 20, 2020], Retrieved from the Internet < https://doi.org/10.1021/nl801811t>.

Strelniker, Y. M., Bergman, D. J., "Optical transmission through metal films with a subwavelength hole array in the presence of a magnetic field", Physical Review B, (May 15, 1999), pp. 12763-12766, vol. 59, No. 20.

Sepulveda, B., Gonzalez-Diaz, J. B., Garcia-Martin, A., Lechuga, L. M., Amelles, G., "Plasmon-Induced Magneto-Optical Activity in Nanosized Gold Disks", Physical Review Letters, (Apr. 9, 2010), 4 pages, vol. 104, No. 147401.

Feng, H. Y., Luo, F., Kekesi, R., Granados, D., Meneses-Rodriguez, D., Garcia, J. M., Garcia-Martin, A., Armelles, G., Cebollada, A., "Magnetoplasmonic Nanorings as Novel Architectures with Tunable Magneto-optical Activity in Wide Wavelength Ranges", Advanced Optical Materials, (2014), pp. 612-617, vol. 2.

Gonzalez-Diaz, J. B., Sepulveda, B., Garcia-Martin, A., Armelles, G., "Cobalt dependence of the magneto-optical response in magnetoplasmonic nanodisks", Applied Physics Letters, (Juy 30,2010), 4 pages, vol. 97, No. 043114.

Du, G. X., Mori, T., Suzuki, M., Saito, S., Fukuda, H., Takahashi, M., "Evidence of localized surface plasmon enhanced magneto-optical effect in nanodisk array", Applied Physics Letters, (Feb. 25, 2010), 4 pages, vol. 96, No. 081915.

Armelles, G., Cebollada, A., Garcia-Martin, A., Garcia-Martin, J. M., Gonzalez, M. U., Gonzalez-Diaz, J. B., Ferreiro-Vila, E., Torrado, J. F., "Magnetoplasmonic nanostructures: systems supporting both plasmonic and magnetic properties", Journal of Optics A-Pure Applied Optics, (Sep. 17, 2009), 11 pages, vol. 11, No. 114023.

Hermann, C., Kosobukin, V. A., Lampel, G Pereitti, J., Safarov, V. I., Bertrand, P., "Surface-enhanced magneto-optics in metallic multilayer films", Physical Review B, (Nov. 29, 2001), vol. 64, No. 235422.

Armelles, G., Gonzalez-Diaz, J. B., Garcia-Martin, A., Garcia-Martin, J. M., Cebollada, A., Gonzalez, M. U. Acimovic, S. Cesario, J., Quidant, R Badenes, G "Localized surface plasmon Yesonance effects on the magneto-optical activity of continuous Au/Co/Au trilayers", Optics Express, (Sep. 28, 2008), 16104-16112, vol. 16, No. 20.

Razdolski, I., Makarov, D., Schmidt, O. G., Kirilyuk, A., Rasing, T., Temnov, V. V., "Nonlinear Surface Magnetoplasmonics in Kretschmann Multilayers", ACS Photonics, (Jul. 19, 2016), pp. 179-183, vol. 3, [online], [retrieved on Oct, 20, 2020], Retrieved from the Internet <https://doi.org/10.1021/acsphotonics.5b00504>.

Temnov, V. V., Armelles, G., Woggon, U., Guzatov, D., Cebollada, A., Garcia-Martin, A., Garcia-Martin, J. M., Thomay, T., Leitenstorfer, A., Bratschitsch, R., "Active magneto-plasmonics in hybrid metal-ferromagnet structures", Nature Photonics, (Jan. 17, 2010), pp. 107-111, vol. 4.

Kreilkamp, L. E., Belotelov, V. i., Chin, J. Y., Neutzner, S., Dregely, D., Wehlus, T., Akimov, I. A., Bayer, M., Stritzker, B., Giessen, H., "Waveguide-Plasmon Polaritons Enhance Transverse Magneto-Optical Kerr Effect", Physical Review X, (Nov. 25, 2013), 7 pages, vol. 3, No. 041019.

Temnov, V. V., "Ultrafast acousto-magneto-plasmonics", Nature Photonics, (Nov. 2012), pp. 728-736, vol. 6.

Davoyan, A. R., Engheta, N., "Theory of Wave Propagation in Magnetized Near-Zero-Epsilon Metamaterials: Evidence for One-Way Photonic States and Magnetically Switched Transparency and Opacity", Physical Review Letters, (Dec. 20, 2013), 5 pages, vol. No. 111, 257401.

Abdi-Ghaleh, R., Suldozi, R., "Magneto-optical characteristics of layered Epsilon-Near-Zero metamaterials", Superlattices and Microstructures, (2016), pp. 242-249, vol. 97.

Schmidt, M. A., Wondraczek, L., Lee, H. W., Granzow, N., DA, N., Russell, P. S., "Complex Faraday Rotation in Microstructured Magneto-optical Fiber Waveguides", Advanced Materials, (2011), pp. 2681-2688, vol. 23.

Sokhoyan, R., Atwater, H. A., "Quantum optical properties of a dipole emitter coupled to an epsilon-near-zero nanoscale waveguide", Optics Express, (Dec. 13, 2013), pp. 32279-32290, vol. 21, No. 26.

Galfsky, T., Sun, Z., Jacob, Z., Menon, V. M., "Preferential emission into epsilon-near-zero metamaterial [Invited]", Optical Materials Express, (Dec. 1, 2015), pp. 2878-2883, vol. 5, No. 12.

(56) References Cited

OTHER PUBLICATIONS

Li, L., Wang, W., Luk, T. S., Yang, X. D., Gao, J., "Enhanced Quantum Dot Spontaneous Emission with Multilayer Metamaterial Nanostructures", ACS Photonics, (Mar. 2, 2017), pp. 501-508, vol. 4, [online], [retrieved on Oct. 20, 2020], Retrieved from the Internet <https://doi.org/10.1021/acsphotonics.6b01039>.

Mac Ciarnain, R., Michaelis, D., Wehlus, T., Rausch, A. F., Wehrmeister, S., Schmidt, T. D., Brutting, W., Danz, N., Brauer, A., Tunnermann, A., "Plasmonic Purcell effect reveals obliquely ordered phosphorescent emitters in Organic LEDs", Scientific Reports, (May 12, 2017), 9 pages, vol. 7, No. 1826.

Caligiuri, V., Palei, M., Imran, M., Manna, L., Krahne, R., "Planar Double-Epsilon-Near-Zero Cavities for Spontaneous Emission and Purcell Effect Enhancement", ACS Photonics, (Mar. 23, 2018), pp. 2287-2294, vol. 5, [online], [retrieved on Oct. 20, 2020], Retrieved from the Internet <https://doi.org/10.1021/acsphotonics.8b00121>.

Silveirinha, M. G., Alu, A., Edwards, B., Engheta, N., "Overview of Theory and Applications of Epsilon-Near-Zero Materials", (2008), http://www.ursi.org/proceedings/procGA08/papers/B01p6.pdf, 4 pages.

Alu, A., Silveirinha, M.G., Salandrino, A., Engheta, N. "Epsilon-Near-Zero (ENZ) Metamaterials and Electromagnetic Sources: Tailoring the Radiation Phase Pattern", American Physical Society, retrieved from <http://dx.doi.org/10.1103/PhysReviewB.75.155410>; Physical Review B, vol. 75, Issue 15, Article 155410, (Apr. 15, 2007), 13 pages.

Davoyan, A. R., Mahmoud, A. M., Engheta, N., "Optical isolation with epsilon-near-zero metamaterials", Optics Express, (Feb. 11, 2013), pp. 3279-3286, vol. 21, No. 3, Philadelphia, USA.

Kats, M.A., Blanchard, R., Ramanathan, S., Capasso, F., "Thin-Film Interference in Lossy, Ultra-Thin Layers", Optics & Photonics News, (Jan. 2014), pp. 40-47.

Babicheva, V., Boltasseva, A., Lavrinenko, A., "Transparent conducting oxides for electro-optical plasmonic modulators", (2015), [retrieved on Aug. 16, 2018], Retrieved from the Internet <http://orbit.dtu.dk/files/115238305/Lavrinenko_Nanophotonics.pdf>, pp. 165-185.

"Metamaterials Market Size, Analysis, Trends, Report, Share, Investment Opportunities and Forecast to 2022", (Feb. 21, 2017), [retrieved on Aug. 3, 2022], Retrieved from the Internet <http://www.abnewswire.com/pressreleases/metamaterials-market-size-analysis-trends-report-share-investment-opportunities-and-forecast-to-2022_100535.html>, 3 pages.

"Telecommunication to be the first commercial application segment for Metamaterials", Markets and Markets Research Private Ltd., Retrieved from the Internet <https://www.marketsandmarkets.com/ResearchInsight/metamaterials.asp>, 2 pages.

"Optical Coating Market by Technology, (IAD, E-Beam Evaporation, Sputtering Process and Vacuum Deposition), by Type, End-Use Industry & by Region—Trends and Forecasts to 2020", (Feb. 2016), 13 pages.

Koch, U., Hoessbacher C.,Niegemann, J., Hafner, C., Leuthold, J., "Digital Plasmonic Absorption Modulator Exploiting Epsilon-Near-Zero in Transparent Conducting Oxides", IEEE Photonics Society, (Feb. 2016), 14 pages, vol. 8, No. 1.

Luk, T.S., Campione, S. Kim, I., Feng, S., Jun, Y. C. Liu, S. Wright, J.B., Catrysse, P. B., Fan, Shanhui, Sinclair, M.B., "Directional perfect adsorption using deep subwavelength low permittivity films", Physical Review B, (Aug. 11, 2014), 14 pages, vol. 90, Issue 8, American Physical Society.

Vassant, S., Hugonin, J., Marquier, F., Greffet, J., "Berreman mode and epsilon near zero mode", Optics Express, (Oct. 8, 2012), pp. 23971-23977, vol. 20, No. 21.

Foley IV, J., Harutyunyan, H., Rosenmann, D., Divan, R., Wiederrecht, G.P., Gray, S.K., "When are Surface Plasmon Polaritons Excited in the Kretschmann-Raether Configuration?", Scientific Reports, (Apr. 15, 2015), 5 pages, vol. 5:9929.

Shi, K., Lu, Z., "Filed-effect optical modulation based on epsilon-near-zero conductive oxide", Optics Communications 370, (2016), pp. 22-28.

Kim, T.Y., Badsha, MD. A., Yoon, J., Lee, S.Y., Jun, Y.C., Hwangbo, C.K., "General Strategy for Broadband Coherent Perfect Absorption and Multi-wavelength All-optical Switching Based on Epsilon-Near-Zero Multilayer Films", Scientific Reports, (Mar. 11, 2016), 11 pages, vol. 6:22941.

Ma, Z., Li, Z., Liu, K., Ye, C., Sorger, V.J., "Indium-Tin-Oxide for High-performance Electro-optic Modulation", Nanophotonics, (2015), pp. 198-213, vol. 4.

Papadakis, G.T., Atwater, H.A., "Field effect-induced tunability in planner hyperbolic metamaterials", PhysRevB.92.184101, Chapter II.A. Electronic properties: High strength dielectrics and TCOs, (Jul. 23, 2015), 20 pages.

Anopchenko, A., Tao, L., Arndt, C., Lee, H.W.H., "Field-Effect Tunable and Broadband Epsilon-Near-Zero Perfect Absorbers with Deep Subwavelength Thickness", ACS Photonics, (2018), pp. 2631-2637, vol. 5.

Naik, G. V., Liu, J., Kildishev, A.V., Shalaev, V.M., Boltasseva, A., "Demonstration of Al:ZnO as a plasmonic component for near-infrared metamaterials", Proceedings of the National Academy of Sciences (PNAS), (Jun. 5, 2012), pp. 8834-8838, vol. 109, No. 23.

Diot, P., International Search Report for International Patent Application No. PCT/US2018/032342, dated Sep. 17, 2018, European Patent Office.

Diot, P., Written Opinion for International Patent Application No. PCT/US2018/032342, dated Sep. 17, 2018, European Patent Office.

Moroz, A., International Search Report for International Patent Application No. PCT/US2019/037605, dated Sep. 4, 2019, European Patent Office.

Moroz, A., Written Opinion for International Patent Application No. PCT/US2019/037605, dated Sep. 4, 2019, European Patent Office.

Vaiano, P., Carotenuto, B., Pisco, M., Ricciardi, A., Quero, G., Consales, M., Crescitelli, A., Esposito, E., Cusano, A., "Lab on Fiber Technology for biological sensing applications", Laser & Photonics Reviews, (Nov. 22, 2016), pp. 922-961,vol. 10, Iss. 6.

Principe, M., Gonsales, M., Micco, A., Crescitelli, A., Castaldi, G., Esposito, E., La Ferrara, V., Cutolo, A., Galdi, V., Cusano, A., "Meta-tips for lab-on-fiber optrodes," Proc. SPIE 9916, Sixth European Workshop on Optical Fibre Sensors, (May 30, 2016), Retrieved Jul. 26, 2022 from <https://doi.org/10.1117/12.2236316>, pp. 1-4, vol. 9916.

"An Introduction to Polarization Directed Flat Lenses", Edmond Optics Woridwide, Retrieved Jul. 26, 2022 from <https://www.google.com/url?sa=t&rcl=j&q=&esrc=s&source=web&cd=&ved=2ahUKEwjEgsPK85b5AhXlmmoFHbvjBtkQFnoECBEQAQ&url=https%3A%2F%2Fwww.edmundoptics.com%2Fglobalassets%2Fdocuments%2Fpolarization-directed-flat-lens-overview.pdf&usg=AOvVaw070sB7UJwAm1JDqJQRkEZM>, (2016), 16 pages.

Ribarov, J., International Search Report for International Patent Application No. PCT/US2018/032342, dated Sep. 17, 2018, European Patent Office.

Shi, K., Lu, Z., "Field-effect optical modulation based on epsilon-near-zero conductive oxide", Optics Communications, (Mar. 3, 2016), pp. 22-28, vol. 370.

Kim, T.Y., Badsha, A., Yoon, J., Lee, S.Y., Jun, Y.C., Hwangbo, C. K., "Genera Strategy for Broadband Coherent Perfect Absorption and Multi-wavelength All-optical Switching Based on Epsilon-Near-Zero Multilayer Films", Scientific Reports, (Mar. 11, 2016), vol. 6, No. 1.

Ma, Z., Li, Z., Liu, K Ye, C., Sorger, V.J., "Indium-Tin-Oxide for High-performance Electro-optic Modulation" Nanophotonics, (Jan. 30, 2015), vol. 4, No. 1.

Papadakis, G.T., Atwater, H.A., "Field effect-induced tunability in planar hyperbolic metamaterials" (Jul. 23, 2015), Retrieved from the Internet <https://arxiv.org/ftp/arxiv/papers/1507/1507.06645.pdf>, 21 pages.

Anopchenko, A., Tao,L., Arndt, C., Lee, H.W.H., "Field-Effect Tunable and Broadband Epsilon-Near-Zero Perfect Absorbers with Deep Subwavelength Thickness", ACS Photonics, (Apr. 23, 2018), pp. 2631-2637, vol. 5, No. 7.

Naik, G. V., Liu, J., Kildishev, A. V., Shalaev, V.M., Boltasseva, A., "Demonstrtion of Al:ZnO as plasmonic component for near-infrared metamaterials", Proceedings of the National Academy of Sciences, (May 18, 2012), pp. 3834-8838, vol. 109, No. 23.

(56) References Cited

OTHER PUBLICATIONS

Tuniz, C., Jain, C., Weidlich, S., Schmidt, M. A., "Broadband azimuthal polarization conversion using gold nanowire enhanced step-index fiber", Optics Letters, (Feb. 1, 2016), pp. 448-451, vol. 41, No. 3.

Schmidt, M. A., Argyros, A., Sorin, F., "Hybrid Optical Fibers—An Innovative Platform for In-Fiber Photonic Devices", Advanced Optical Materials, (2016), pp. 13-36, vol. 4.

Schmidt, M. A., Russell, P. S., "Long-range spiralling surface plasmon modes on metallic nanowires", Optics Express, (Sep. 1, 2008), pp. 13617-13623, vol. 16, No. 18.

Lee, H. W., Schmidt, M. A., Tyagi, H. K., Sempere, L. P., Russell, P. S. J., "Polarization-dependent coupling to plasmon modes on submicron gold wire in photonic crystal fiber", Applied Physics Letters, (Sep. 15, 2008), 4 pages. vol. 93.

Lee, H. W., Schmidt, M. A., Russell, P. S. J., "Excitation of a nanowire "molecule" in gold-filled photonic crystal fiber". Opt. Lett. 37, (2012), pp. 2946-2948.

Ubel, P., Schmidt, M. A., Lee, H. W., Russell, P. S., "Polarisation-resolved near-field mapping of a coupled gold nanowire array". Optics Express, (Dec. 17, 2012), pp. 28409-28417, vol. 20.

Kim, H., An, H., Kim, J., Lee, S., Park, K., Hong, S., Vazquez-Zuniga, L. A., Lee, S. Y., Lee, B., Jeong, Y. J, "Corrugation-assisted metal-coated angled fiber facet for wavelength-dependent off-axis directional beaming", Optics Express, (Apr. 3, 2017), pp. 8366-8385, vol. 25, No. 7.

Jia, P. P., Yang, J., "A plasmonic optical fiber patterned by template transfer as a high-performance flexible nanoprobe for real-time biosensing", Nanoscale, (May 16, 2014), pp. 8836-8843, vol. 6, [online], [retrieved on Oct. 24, 2020], Retrieved from the Internet <DOI: 10.1039/c4nr01411a>.

Jia, P. P., Yang, J., "Integration of large-area metallic nanohole arrays with multimode optical fibers for surface plasmon resonance sensing", Applied Physics Letters, (Jun. 19, 2013), 4 pages, vol. 102, No. 3.

Zhang, Z. J., Chen, Y. Y., Liu, H. J., Bae, H. D., Olson, D. A., Gupta, A. K., Yu, M., "On-fiber plasmonic nterferometer for multi-parameter sensing", Optics Express, (Apr. 20, 2015), pp. 10732-10740, vol. 23, No. 8.

Reader-Harris, P., Di Falco, A., "Nanoplasmonic Filters for Hollow Core Photonic Crystal Fibers", ACS Photonics, (Sep. 16, 2014), pp. 985-989, vol. 1, [online], [retrieved on Oct. 23, 2020], Retrieved from the Internet <https://doi.org/10.1021/ph500222w>.

Arabi, H. E., Joe, H. E., Nazari, T., Min, B. K., Oh,, "A high throughput supra-wavelength plasmonic bull's eye photon sorter spatially and spectrally multiplexed on silica optical fiber facet", Optics Express, (2013), pp. 28083-28094, vol. 21.

Du, J., Chen, S., Liu, J., Zhu, L., Zhao, Y., Wang, J., "Design and Fabrication of Metasurface on Conventional Optical Fiber Facet for Linearly Polarized Mode (LP11) Generation at Visible Light Wavelength", CLEO: Applications and Technology, (2016), 2 pages.

Liu, Y. X., Xu, H., Stief, F., Zhitenev, N., Yu, M., "Far-field superfocusing with an optical fiber based surface plasmonic lens made of nanoscale concentric annular slits", Optics Express, (Oct. 10, 2011), pp. 20233-20243, vol. 19, No. 1.

Saleh, A. A. E., Sheikhoelislami, S. Gastelum, S., Dionne, J. A., "Grating-flanked plasmonic coaxial apertures for efficient fiber optical tweezers", Optics Express, (Sep. 5, 2016), pp. 20593-20603, vol. 24, No. 18.

Principe, M., Consales, M., Micco, A., Crescitelli, A., Castaldi, G., Esposito, E., La Ferrara, V., Cutolo, A., Galdi, V., Cusano, A., "Optical fiber meta-tips", Light: Science & Applications, (Mar. 10, 2017), 10 pages, vol. 6, No. e16226.

Yu, N. F., Capasso, F., "Optical Metasurfaces and Prospect of Their Applications Including Fiber Optics" Journal Lightwave Technology, (Jun. 15, 2015), vol. 33, No. 12.

Naik, G. V., Shalaev, V. M., Boltasseva, A., "AlterVolnative Plasmonic Materials: Beyond Gold and Silver", Advanced Materials, (2013), pp. 3264-3294, vol. 25.

Boltasseva, A., Atwater, H. A., "Low-Loss Plasmonic Metamaterials", Science, (Jan. 21, 2011), pp. 290-291, vol. 331, [online], [retrieved on Oct. 26, 2020], Retrieved from the Internet <https://doi.org/10.1126/science.1198258>.

Naik, G. V., Kim, J., Boltasserva, A., "Oxides and nitrides as alternative plasmonic materials in the optical range", Optical Materials Express, (Oct. 1, 2011), pp. 1090-1099 vol. 1, No. 6.

Li, S. Q., Guo, P. J., Zhang, L. X., Zhou, W., Odom, T. W., Seideman, T., Ketterson, J. B., Chang, R. P. H., "Infrared Plasmonics with Indium-Tin-Oxide Nanorod Arrays", Acs Nano, (Oct. 21, 2011), pp. 9161-9170, vol. 5, No. 11, [online], [retrieved on Oct. 26, 2020], Retrieved from the Internet <https://pubs.acs.org/>.

Guler, U., Naik, G. V., Boltasseva, A., Shalaev,V. M., Kildishev, A. V., "Performance analysis of nitride alternative plasmonic materials for localized surface plasmon applications", Applied Phys B-Lasers and Optics, (2012), pp. 285-291, vol. 107, [online], [retrieved on Oct. 26, 2020], Retrieved from the Internet <https://doi.org/10.1007/s00340-012-4955-3>.

Dominici, L., Michelotti, F., Brown, T. M., Reale, A., Di Carlo, A., "Plasmon polaritons in the near infrared on fluorine doped tin oxide films", Optics Express, (Jun. 8, 2009), pp. 10155-10167, vol. 17, No. 12.

Franzen, S., Rhodes, C., Cerruti, M., Gerber, R. W., Losego, M., Maria, J. P., Aspnes, D. E., "Plasmonic phenomena in indium tin oxide and ITO-Au hybrid films", Optics Letters, (Sep. 15, 2009), pp. 2867-2869, vol. 34, No. 18.

Kim, J., Naik, G. V., Emani, N. K., Guler, U., Boltasseva, A., "Plasmonic Resonances in Nanostructured Transparent Conducting Oxide Films". IEEE Journal of Selected Topics in Quantum Electronics, (Jun. 2013), 7 pages, vol. 19, No. 3, [online], [retrieved on Oct. 23, 2020], Retrieved from the Internet <https://doi.org/10.1109/JSTQE.2013.2238611>.

Liu, X. G., Park, J., Kang, J. H., Yuan, H. T., Cui, Y., Hwang, H. Y., Brongersma, M. L., "Quantification and impact of nonparabolicity of the conduction band of indium tin oxide on its plasmonic properties", Applied Physics, Letters, (Nov. 7, 2014), 6 pages, vol. 105, No. 181117.

West, P. R., Ishii, S., Naik, G. V., Emani, N. K., Shalaev, V. M., Boltasseva, A., "Searching for better plasmonic materials", Laser & Photonics Reviews, (Mar. 1, 2010), pp. 795-808, vol. 4, No. 6, [online], [retrieved on Oct. 23, 2020], Retrieved from the Internet <https://doi.org/10.1002/ lpor.200900055>.

Verma, R. K., Gupta, B. D., "Surface plasmon resonance based fiber optic sensor for the IR region using a conducting metal oxide film", J. Opt. Soc. Am. A, (Apr. 2010), pp. 846-851, vol. 27, No. 4, Optical Society of America.

Rhodes, C., Franzen, S., Maria, J. P., Losego, M., Leonard, D. N., Laughlin, B., Duscher, G., Weibel, S., "Surface plasmon resonance in conducting metal oxides", Journal of Applied Physics, (Sep. 8, 2006), 5 pages. vol. 100, [online], [retrieved on Oct. 23, 2020], Retrieved from the Internet <https://doi.org/10.1063/1.2222070>.

Michelotti, F., Dominici, L., Descrovi, E., Danz, N., Menchini, F., "Thickness dependence of surface plasmon polariton dispersion in transparent conducting oxide films at 1.55 mu m", Optics Letters, (Mar. 15, 2009), pp. 339-841, vol. 34, No. 6.

Abb, M., Sepulveda, B., Chong, H. M. H., Muskens, O. L., "Transparent conducting oxides for active hybrid metamaterial devices", J Optics-Uk, (Jul. 27, 2012), 8 pages, vol. 14, No. 114007, [online], [retrieved on Oct. 23, 2020], Retrieved from the Internet <https://doi.org/10.1088/2040-8978/14/11/114007>.

Noginov, M. A., Gu, L., Livenere, J., Zhu, G., Pradhan, A. K., Mundle,R., Bahoura, M., Barnakov, Y. A., Podolskiy, V. A., "Transparent conductive oxides: Plasmonic materials for telecom wavelengths", Applied Physics Letters, (Juy 11, 2011), 4 pages, vol. 99, No. 021101.

Buonsanti, R., Llordes, A., Aloni, S., Helms, B. A., Milliron, D. J., "Tunable Infrared Absorption and Visible Transparency of Colloidal Aluminum-Doped Zinc Oxide Nanocrystals", Nano Letters, (Oct. 4, 2011), pp. 4706-4710, vol. 11, [online], [retrieved on Oct. 23, 2020], Retrieved from the Internet <https://doi.org/10.1021/nl203030f>.

Traviss, D., Bruck, R., Mills, B., Abb, M., Muskens, O. L., "Ultrafast plasmonics using transparent conductive oxide hybrids in

(56) References Cited

OTHER PUBLICATIONS the epsilon-near-zero regime", Applied Physics Letters, (Mar. 27, 2013), 8 pages, vol. 102, No. 121112.

Calzolari, A., Ruini A., Catellani, A., "Transparent Conductive Oxides as Near-IR Plasmonic Materials: The Case of Al-Doped ZnO Derivatives", Acs Photonics, (Jul. 3, 2014), pp. 703-709 , vol. 1, [online], [retrieved on Oct. 23, 2020], Retrieved from the Internet < https://doi.org/10.1021/ph500118y>.

Anopchenko, A., Gurung, S., Tao, L., Armdt, C., Lee, H. W., "Atomic Layer Deposition of Ultra-thin and smooth Al-doped ZnO for Zero-Index Photonics", Materials Research Express, (Jan. 24, 2018), 7 pages, vol. 5, No. 014012.

Herzing, A. A., Guler, U., Zhou, X. L., Boltasseva, A., Shalaev, V., Norris, T. B., "Electron energy loss spectroscopy of plasmon resonances in titanium nitride thin films", Applied Physics Letters, (Apr. 29, 2016), 5 pages, vol. 108, No. 171107.

Guler, U., Shalaev, V. M., Boltasseva, A., "Nanoparticle plasmonics: going practical with transition metal nitrides", Materials Today, (May 2015), pp. 227-237, vol. 18, No. 4.

Gui, L., Bagheri, S., Strohfeldt, N., Hentschel, M., Zgrabik, C. M., Metzger, B., Linnenbank, H., Hu, E. L., Giessen, H., "Nonlinear Refractory Plasmonics with Titanium Nitride Nanoantennas", Nano Letters, (Aug. 5, 2016), pp. 5708-5713, vol. 16, [online], [retrieved on Oct. 26, 2020], Retrieved from the Internet < https://doi.org/10.1021/acs.nanolett.6b02376>.

Lalisse, A., Tessier, G., Plain, J., Baffou, G., "Plasmonic efficiencies of nanoparticles made of metal nitrides (TiN, ZrN) compared with gold", Scientific Reports, (Dec. 9, 2016), pp. 38647-38647, vol. 6.

He, W. Y., Al, K. L., Jiang, C. H., Li, Y. Y., Song, X. F., Lu, L. H., "Plasmonic titanium nitride nanoparticles for in vivo photoacoustic tomography imaging and photothermal cancer therapy", Biomaterials, (Apr. 7, 2017), pp. 37-47, vol. 132.

Li, W., Guler, U., Kinsey, N., Naik, G. V., Boltasseva, A., Guan, J., Shalaev, V. M., Kildishev, A. V., "Refractory plasmonics with titanium nitride: broadband metamaterial absorber", Advanced Materials, (2014), pp. 7959-7965, vol. 26.

Silveirinha, M., Engheta, N., "Tunneling of electromagnetic energy through subwavelength channels and bends using epsilon-near-zero materials", Physical Review Letter, (2006), 4 pages, vol. 97, No. 157403.

Davoyan, A. R., Mahmoud, A. M., Engheta, N., "Optical isolation with epsilon-near-zero metamaterials", Optical Express, (Feb. 1, 2013), pp. 3279-3286 vol. 21, No. 3.

Alam, M. Z., De Leon, I., Boyd, R. W., "Large optical nonlinearity of indium tin oxide in its epsilon-near-zero region", Science, (May 13, 2016), pp. 795-797, vol. 52, Issue 6287,[online], [retrieved on Oct. 26, 2020], Retrieved from the Internet <10.1126/science. aae0330>.

Yoon, J., Zhou, M. Badsha, M. A., Kim, T. Y., Jun, Y. C., Hwangbo, C. K. "Broadband Epsilon-Near-Zero Perfect Absorption in the Near-Infrared", Scientific Reports, (Aug. 4, 2015), 8 pages, vol. 5.

Luk, T. S., Campione, S., Kim, I., Feng, S. M. Feng, Jun, Y. C., Liu, S., Wright, J. B., Brener, I., Catrysse, P. B., Fan, S. H., Sinclair, M. B., "Directional perfect absorption using deep subwavelength low-permittivity films", Physical Review, (2014), 10 pages, vol. B, No. 90, 085411.

Kim, T. Y., Badsha, M. A., Yoon, J., Lee, S. Y., Jun, Y. C., Hwangbo, C. K., "General Strategy for Broadband Coherent Perfect Absorption and Multi-wavelength All-optical Switching Based on Epsilon-Near-Zero Multilayer Film", Scientific Reports, (Mar. 11, 2016), 11 pages, vol. 6, No. 22941.

Campione, S., Brener, I., Marquier, F., "Theory of epsilon-near-zero modes in ultrathin films", Physical Review, (Mar. 16, 2015), 5 pages, vol. B, No. 91.

Feng, S., Halterman, K., "Coherent perfect absorption in epsilon-near-zero metamaterials", Physical Review, (2012), Issue B, No. 86.

Campione, S., Wendt, J. R., Keeler, G. A., Luk, T. S., "Near-Infrared Strong Coupling between Metamaterials and Epsilon-near-Zero Modes in Degenerately Doped Semiconductor Nanolayers", ACS Photonics, (Jan. 14, 2016), pp. 293-297, vol. 3, [online], [retrieved on Oct. 19, 2020], Retrieved from the Internet <https://doi.org/10.1021/acsphotonics.5b00663>.

Javani, M. H., Stockman, M. I., "Real and Imaginary Properties of Epsilon-Near-Zero Materials", Physical Review Letters, (Sep. 2, 2016), 6 pages, vol. 117, No. 107404.

Kim, J., Dutta, A., Naik, G. V., Giles, A. J., Bezares, F. J., Ellis, C. T., Tischler, J. G., Mahmoud, A. M., Caglayan, H., Glembocki, O. J., Kildishev, A. V., Caldwell, J. D., Boltasseva, A., Engheta, N. "Role of epsilon-near-zero substrates in the optical response of plasmonic antennas" Optica, (Mar. 2016), pp. 339-346, vol. 3, No. 3.

Campione, S., Kim, I., Ceglia, D., Keeler, G. A., Luk, T. S., "Experimental verification of epsilon-near-zero blasmon polariton modes in degenerately doped semiconductor nanolayers" Optical Express, (2016), pp. 18782-18789, vol. 24.

Capretti, A., Wang, Y., Engheta, N., Dal Negro, L., "Comparative Study of Second-Harmonic Generation from Epsilon-Near-Zero Indium Tin Oxide and Titanium Nitride Nanolayers Excited in the Near-Infrared Spectral Range", Acs Photonics, (Oct. 5, 2015), pp. 1584-1591, vol. 2, [online], [retrieved on Oct. 19, 2020], Retrieved from the Internet <https://doi.org/10.1021/acsphotonics.5b00355>.

Caspani, L., Kaipurath, R. P. M., Clerici, M., Ferrera, M., Roger, T., Kim, J., Kinsey, N., Pietrzyk, M., Di Falco, A., Shalaev, V. M., Boltasseva, A., Faccio, D., "Enhanced Nonlinear Refractive Index in epsilon-Near-Zero Materials", Physical Review Letters, (Jun. 10, 2016), vol. 116, No. 233901.

Kinsey, N., Devault, C., Kim, J., Ferrera, M., Shalaev, V. M., Boltasseva, A., "Epsilon-near-zero Al-doped ZnO for ultrafast switching at telecom wavelengths", Optica, (Jul. 2015), pp. 616-622, vol. 2, No. 7.

Yang, Y. M., Kelley, K., Sachet, E., Campione, S., Luk, T. S., Maria, J. P., Sinclair, M. B., Brener, I., "Femtosecond optical polarization switching using a cadmium oxide-based perfect absorber", Nature Photonics, (May 1, 2017), pp. 390-395, vol. 11.

Alam, M. Z., De Leon, I., Boyd, R. W., "Large optical nonlinearity of indium tin oxide in its epsilon-near-zero region", Science, (May 13, 2016), pp. 795-797, vol. 352, Issue 6287, [online], [retrieved on Oct. 26, 2020], Retrieved from the Internet <https://science.sciencemag.org>.

Kim J., Dutta, A., Baik, G. V., Giles, A. J., Bezares, F. J., Elis, C., Tischler, J., Mahmoud, A. M., Caglayan, H., Glembocki, O. J., Kildishev, A. V., Caldwell, J. D., Boltasseva, A., Engheta, N., "Role of epsilon-near-zero substrates in the optical response of plasmonic antennas", Optica, (Mar. 2016), pp. 339-346, vol. 3, No. 3, [online], [retrieved on Oct. 26, 2020], Retrieved from the Internet <https://doi.org/10.1364/OPTICA.3.000339>.

Alu, A., Silveirinha, M. G., Salandrino, A., Engheta, N., "Epsilon-near-zero metamaterials and electromagnetic sources: Tailoring the radiation phase pattern", Physical Review, (2007), 13 pages, vol. B, No. 75, 155410.

Vasudev, A., Kang, J., Park, J., Liu, X., Brongersma, M., "Electro-optical modulation of a silicon waveguide with an "epsilon-near-zero" material", Optics Express, (Nov. 4, 2013), pp. 26387-26397, vol. 21, No. 22.

Zhaolin, L., Wangshi, Z., Kaifeng, S., "Ultracompact Electroabsorption Modulators Based on Tunable Epsilon-Near-Zero-Slot Waveguides" Photonics Journal, IEEE, (Jun. 2012), pp. 735-740, vol. 4, No. 3.

Feigenbaum, E., Diest, K., Atwater, H. A., "Unity-Order Index Change in Transparent Conducting Oxides at Visible Frequencies", Nano Letters, (May 18, 2010), pp. 2111-2116, vol. 10, [online], [retrieved on Oct. 26, 2020], Retrieved from the Internet <https://pubs.acs.org/sharingguidelines>.

Huang, Y. W., Lee, H. W., Sokhoyan, R., Pala, R. A., Thyagarajan, K., Han, S., Tsai, D. P., Atwater, H. A., "Gate-Tunable Conducting Oxide Metasurfaces", Nano Letters, (Aug. 26, 2016), pp. 5319-5325 vol. 16, [online], [retrieved on Oct. 26, 2020], Retrieved from the Internet <https://pubs.acs.org/sharingguidelines>.

Lee, H. W., Papadakis, G., Burgos, S. P., Chander, K., Kriesch, A., Pala, R., Peschel, U., Atwater, H. A., "Nanoscale Conducting Oxide PlasMOStor", Nano Letters, (Oct. 10, 2014), pp. 6463-6468, vol.

(56) References Cited

OTHER PUBLICATIONS

14, [online], [retrieved on Oct. 26, 2020], Retrieved from the Internet <https://doi.org/10.1021/nl502998z>.
Shi, K. F., Haque,. R., Zhao, B. Y., Zhao, R. C., Lu, Z. L., "Broadband electro-optical modulator based on tansparent conducting oxide", Optics Letters, (Sep. 1, 2014), pp. 4978-4981, vol. 39, No. 17.
Cai, W., White, J. S., Brongersma, M. L., "Compact, High-Speed and Power-Efficient Electrooptic Plasmonic Modulators", Nano Letters, (2009), pp. 4403-4411, vol. 9, No. 12, [online], [retrieved on Oct. 26, 2020], Retrieved from the Internet <https://doi.org/10.1021/nl902701b>.
Koch, U., Hoessbacher, C., Niegemann, J., Hafner, C., Leuthold, J., "Digital Plasmonic Absorption Modulator Exploiting Epsilon-Near-Zero in Transparent Conducting Oxides", IEEE Photonics Journal, (Feb. 2016), pp. 1-13, vol. 8, No. 1.
Kwon, M. S., "Discussion of Two Ways of Optically Modeling Indium-Tin-Oxide Layers in Slot Waveguides for Waveguide Analysis", IEEE Photonics Journal, (Feb. 2016), 9 pages, vol. 8, No. 1, 4900108.
Lin, C., Helmy, A. S., "Dynamically reconfigurable nanoscale modulators utilizing coupled hybrid plasmonics", Scientific Reports, (Jul. 20, 2015),10 pages, vol. 5, 12313.
Pradhan, A. K., Mundle, R. M., Santiago, K., Skuza, J. R., Xiao, B., Song, K. D., Bahoura, M., Cheaito, R., Hopkins, P. E., "Extreme tunability in aluminum doped Zinc Oxide plasmonic materials for near-infrared applications", Scientific Reports, (Sep. 11, 2014), 7 pages, vol. 4, No. 6415.
Baek, J., You, J. B, Yu, K., "Free-carrier electro-refraction modulation based on a silicon slot waveguide with ITO", Optics Express, (Jun. 8, 2015), pp. 15863-15876, vol. 23, No. 12.
Ma, Z. Z., Li, Z. R., Liu, K., Ye, C. R., Sorger, V. J., "Indium-Tin-Oxide for High-performance Electro-optic Modulation", Nanophotonics, (Mar. 24, 2015), pp. 198-213, vol. 4.
Krasavin, A. V., Zayats, A. V., "Photonic Signal Processing on Electronic Scales: Electro-Optical Field-Effect Nanoplasmonic Modulator", Physical Review Letters, (Aug. 2012), 5 pages, vol. 109, No. 053901.
Liu, K., Ye, C. R., Khan, S., Sorger, V. J., "Review and perspective on ultrafast wavelength-size electro-optic modulators", Laser & Photonics Reviews, (2015), pp. 172-194, vol. 9, No. 2.
Huang, C., Lamond, R. J., Pickus, S. K. Li, Z. R., Sorger, V. J., "A Sub-lambda-Size Modulator Beyond the Efficiency-Loss Limit", IEEE Photonics Journal, (Aug. 2013), 12 pages, vol. 5, No. 4.
Melikyan, A., Lindenmann, N., Walheim, S., Leufke, P. M., Ulrich, S., Ye, J., Vincze, P., Hahn, H., Schimmel, T., Koos, C., Freude, W., Leuthold, J., "Surface plasmon polariton absorption modulator", Optical Express, 19, (Apr. 25, 2011), pp. 8855-8869, vol. 19, No. 9.
Wang, H., Zhang, J. W., Zhao, H., "Surface plasmon polariton excitation by electrostatic modulation and phase grating in indium-tin-oxide coated lithium niobate slabs", Journal of Applied Physics, (Aug. 15, 2015), 8 pages, vol. 118, 063102, AIP Publishing, LLC.
Babicheva, V. E., Kinsey, N., Naik, G. V., Ferrera, M., Lavrinenko, A. V., Shalaev, V. M., Boltasseva, A., "Towards CMOS-compatible nanophotonics: Ultra-compact modulators using alternative plasmonic materials", Optical Express, (Nov. 4, 2013), pp. 27326-27337, vol. 21.
Sorger, V., Lanzillotti-Kimura, N., Ma, R., Zhang, X., "Ultra-compact silicon nanophotonic modulator with proadband response", Nanophotonics, (2012), pp. 17-22, vol. 1.
Liu, X., Hang, J. H., Yuan, H., Park, J., Kim, S. J., Cui, Y. Hwang, H. Y. Brongersma, M. L., "Electrical uning of a quantum plasmonic resonance", Nature Nanotechnology, (Sep. 2017), pp. 866-870, vol. 12.
Park, J., Kang, J. H., Kim, S. J., Liu, X. G., Brongersma, M. L., "Dynamic Reflection Phase and Polarization Control in Metasurfaces", Nano Letters, (2017), pp. 407-413, vol. 17, [online], [retrieved on Oct. 27, 2020], Retrieved from the Internet <https://doi.org/10.1021/acs.nanolett.6b04378>.
Li, H., Xu, S., Wang, H., Gu, Y., Lombardi, J. R. Xu, W., "Active-Tuned Plasmonic Angle Modulator of Light Seams for Potential Application of 3D Display", Acs Photonics, (Jul. 22, 2014), pp. 677-6828, vol. 1, ACS Publications.
Babicheva, V. E., Lavrinenko, A. V., "Plasmonic modulator optimized by patterning of active layer and tuning permittivity". Optics Communications, (Aug. 23, 2012), pp. 5500-5507, vol. 285.
Shi, K. F., Haque, R. R., Zhao, W. S., Zhao, R. C. Lu, Z. L., "Tunable plasmonic metamaterial based on tansparent conducting oxide", Proceeding of Spie, (Mar. 17, 2014), 8 pages, vol. 8980.
Keller, J., "Air Force reaching out to industry for latest in high-power fiber lasers for airborne laser weapons", (Sep. 13, 2017), 20 pages, [online], [retrieved on Oct. 28, 2020], Retrieved from the Internet <http://www.militaryaerospace.com/articles/2017/09/laser-weapons-fiber-lasers-high-power.html>.
Extance, A., "Military technology: Laser weapons get real", Nature, (May 28, 2015), pp. 408-410, vol. 521.
Szondy, D., "Lockheed Martin to hand record 60-kW laser weapon over to the US Army", (Mar. 19, 2017), 7 pages, [online], [retrieved on Oct. 26, 2020], Retrieved from the Internet <https://newatlas.com/lockheed-martin-laser-60-kw/48467/>.
"Lockheed to adapt fiber laser weapon for fighter jet", (Nov. 7, 2017), 3 pages, [online], [retrieved on Oct. 26, 2020], Retrieved from the Internet <http://optics.org/news/8/11/8>.
Sprangle, P., Ting, A., Penano, J., Fischer, R., Hafizi, B., "Incoherent Combining and Atmospheric Propagation of High-Power Fiber Lasers for Directed-Energy Applications", IEEE Journal of Quantum Electronics, (Feb. 2009), pp. 138-148, vol. 45, No. 2.
"DARPA extends laser weapon range", (Mar. 11, 2014), 3 pages, [online], [retrieved on Oct. 22, 2020], Retrieved from the Internet <http://optics.org/news/5/3313>.
Kinsey, N., Syed, A. A., Courtwright, D., Devault, C., Bonner, C.E., Gavrilenko, V. I., Shalaev, V., Hagan, D.J., Van Stryland, E.W., Boltasseva, A., "Effective third-order nonlinearities in metallic refractory itanium nitride thin films", Optics Express, (Oct. 2, 2015), pp. 2395-2403, vol. 5, No. 11, Optical Materials Express.
Hutchens, T. C., Darafsheh, A., Fardad, A., Antoszyk, A. N., Ying, H. S., Astratov, V. N., Fried, N. M., "Characterization of novel microsphere chain fiber optic tips for potential use in ophthalmic laser surgery", Journal of Biomedical Optics, (Jun. 2012), 8 pages, vol. 17, No. 6, 068004.
Hutchens, T. C., Darafsheh, A., Fardad, A., Antoszyk, A. N., Ying, H. S., Astratov, V. N. A, Fried, N. M., "Detachable fiber optic tips for use in thulium fiber laser lithotripsy", Journal of Biomedical Optics, (Mar. 2013), 9 pages, vol. 18, No. 3, 068004.
Jacobson, A. S., Woo, P., Shapshay, S. M., "Emerging technology: Flexible CO2 laser WaveGuide", Otolaryng Head and Neck, (2006), pp. 469-470, vol. 135.
Morin, F., Druon, F., Hanna, M., Georges, P., "Microjoule femtosecond fiber laser at 1.6 microm for corneal surgery applications", Optical Letters, (Jul. 1, 2009), 3 pages, vol. 34, No. 13.
Anopchenko, A., Lee, H. W. H., "ENZ conducting oxide broadband perfect absorbers with deep sub-wavelength thickness", Conference on Lasers and Electro-Optics, (2017), 2 pages, JTh2A.94.
Faez, S., Lahini, Y., Weidlich, S Garmann, R. F., Wondraczek, K., Zeisberger, M., Schmidt, M. A., Orrit, M., Manoharan, V. N., "Fast, Label-Free Tracking of Single Viruses and Weakly Scattering Nanoparticles in a Nanofluidic Optical Fiber", ACS Nano, (Oct. 27, 2015), pp. 12349-12357, vol. 9, No. 21, [online], [retrieved on Oct. 27, 2020], Retrieved from the Internet <https://doi:10.1021/acsnano.5b05646>.
Vassant, S., Hugonin, J.-P., Marquier, F., Greffet, J.-J., "Berreman mode and epsilon near zero mode", Optics Express, (Oct. 4, 2012), pp. 23971-23977, 7 pages, vol. 20, No. 21.
Guo, Xiaohui, Yang, Xinghua, Li, Song, Liu, Zhihai, Hu, Minggang, Qu, Bin, Yuan, Libo, "An integrated nematic liquid crystal in-fiber modulator derivates from capillary optical fiber", Elsevier, Feb. 4, 2016, pp. 249-253, Optics Communications.
Myren, N., Margulis, W., "All-Fiber Electrooptical Mode-Locking and Tuning", IEEE Photonics Technology Letters, Oct. 2005, pp. 2047-2049, vol. 17, No. 10.

(56) References Cited

OTHER PUBLICATIONS

Pu, S., Chen, X., Chen, Y., Xu, Y., Liao, W., Chen, L., Xia, Y., "Fiber-optic evanescent field modulator using a magnetic fluid as the classing", Journal of Applied Physics, May 15, 2006, 5 pages, American Institute of Physics.

Zhou, F., Hao, R., Jin, X., Zhang, X., Li, E., "A Graphene-Enhanced Fiber-Optic Phase Modulator with Large Linear Dynamic Range", IEEE Photonics Technology Letters, Sep. 15, 2014, pp. 1867-1870, vol. 26, No. 18.

Yu, N., Capasso, F., "Flat optics with designer metasurfaces", Nature Materials, Jan. 23, 2014, pp. 139-150, vol. 13, Macmillan Publishers Limited.

Kildishev, A.V., Boltasseva, A., Shalaev, V. M., "Planar Photonics with Metasurfaces", Mar. 15, 2013, 8 pages. Science, vol. 339, AAAS.

Meinzer, N., Barnes, W. L., Hooper, I. R., "Plasmonic meta-atoms and metasurfaces", Dec. 27, 2014, pp. 389-898, vol. 8, Macmillan Publishers Limited.

Yu, N., Genevet, P., Kats, M. A., Aieta, F.,Tetienne, J. P., Capasso, F., Gaburro, Z., "Light Propagation with Phase Discontinuities: Generalized Laws of Reflection and Refraction", Science, Oct. 21, 2011, pp. 333-337, vol. 334.

Aieta, F., Genevet, P., Kats, M.A., Yu, N., Blanchard, R., Gaburro, Z., Capasso, F., "Aberration-Free Ultrathin Flat Lenses and Axicons at Telecom Wavelengths Based on Plasmonic Metasurfaces", Nano Letters, pp. 4932-4936, vol. 12, ACS Publications.

Kang, M., Feng, T., Wang, H,, Li, J., "Wave front engineering from an array of thin aperture antennas", Optics Express, Jul. 2, 2012, pp. 15882-15890, vol. 20 No. 14.

Genevet, P., Yu, N., Aieta, F., Lin, J., Kats, M. A., Blanchard, R., Scully, M.O., Gaburro, Z., Capasso, F., "Ultra-thin plasmonic optical vortex plate based on phase discontinuities", Jan. 3, 2012, 4 pages, American Institute of Physics.

Chen,W. T., Yang, K., Wang, C., Huang, Y., Sun, G., Chiang, I., Liao, C.Y., Hsu, W., Lin, H.T., Sun, S., Zhou, L., Liu, A. Q., Tsai, D. P., "High-Efficiency Broadband Meta-Hologram with Polarization-Controlled Dual mages", NANO Letters, Dec. 13, 2013, pp. 225-230, vol. 14, ACS Publications.

Ni, X., Kildishev, A.V., Shalaev, V. M., "Metasurface holograms for visible light", Nature Communications, Nov. 15, 2013, 6 pages, Macmillan Publishers Limited.

Zheng, G., Muhlenbernd, H., Kenney, M., Li, G., Zentgraf, T., Zhang, S., "Metasurface holograms reaching 80% efficiency", Nature Nanotechnology, Feb. 25, 2015, 5 pages, Macmillan Publishers Limited.

Genevet, P., Capasso, F., "Holographic optical metasurfaces: a review of current progress",Reports on Progress in Physics, Jan. 15, 2015, 19 pages, vol. 78, IOP Publishing Ltd.

Huang, L., Chen, X., Muhlenbernd, H., Zhang, H., Chen, S., Bai, B., Tan, Q., Jin, G., Chea, K., Qui, C., Li, J., Zentgraf, T., Zhang, S., "Three-dimensional optical holography using a plasmonic metasurface", Nature Communications, (Nov. 15, 2013), 8 pages, Macmillan Publishers Limited.

Lin, J., Mueller, B., Wang, Q., Yuan, G., Antoniou, N., Yuan, X., Capasso, F., "Polarization-Controlled Tunable Directional Coupling of Surface Plasmon Polaritons", Science, Apr. 19, 2013, pp. 331-334, vol. 340.

Jin, J., Luo, J., Zhang, X.,Gao, H., Li, X., Pu, M., Gao, P., Zhao, Z., Luo, X., "Generation and detection of orbital angular momentum via metasurface", Scientific Reports, Apr. 7, 2016, 7 pages.

Li, G., Kang, M., Chen, S., Zhang, S., Pun, E., Cheah, K.W., Li, J., "Spin-Enabled Plasmonic Metasurfaces for Manipulating Orbital Angular Momentum of Light", Nano Letters, Aug. 21, 2013, 4148-4151, vol. 13, [online], [retrieved on Oct. 23, 2020], Retrieved from the Internet <https://doi.org/10.1021/nl401734r>, ACS Publications.

Karimi, E., Schulz, S. A., I. D. Leon, H. Qassim, J. Upham, R. W. Boyd, Generating optical orbital angular momentum at visible wavelengths using a plasmonic metasurface, Light: Science & Applications, (May 9, 2014), vol. 3, No. e167.

Buchnev, O., Podoliak, N., Kaczmarek, M., Zheludev, N., Fedotov, V., "Electrically Controlled Nanostructured Metasurface Loaded with Liquid Crystal: Toward Multifunctional Photonic Switch", Advanced Optical Materials, (2015), pp. 674-679, vol. 3, WILEY-VCH Verlag GmbH & Co. KGaA, Weinheim.

Lee, J., Jung, S., Chen, P., Lu, F., Demmerle, F., Boehm, G., Amann, M., Alu, A., Belkin, M., "Ultrafast Electrically Tunable Polaritonic Metasurfaces", Advanced Optical Materials, (2014), pp. 1057-1063, vol. 2.

Sautter, J., Staude, I., Decker, M., Rusak, E., Neshev, D., Brener, I., Kivshar, Y., "Active Tuning of All-Dielectric Metasurfaces", Acs Nano, (2015), pp. 4308-4315, vol. 9, [online], [retrieved on Oct. 23, 2020], Retrieved from the Internet <https://doi.org/10.1021/acsnano.5b00723>.

Dabidian, N., Kholmanov, I., Khanikaev, A. B., Tatar, K., Trendafilov, S., Mousavi, S. H., Magnuson, C., Ruoff, R. S., Shvets, G., "Electrical Switching of Infrared Light Using Graphene Integration with Plasmonic Fano Resonant Metasurfaces", Acs Photonics, (2015), pp. 216-227, vol. 2, [online], [retrieved on Oct. 23, 2020], Retrieved from the Internet <https://doi.org/10.1021/ph5003279>.

Decker, M., Kremers, C., Minovich, A., Staude, I., Miroshnichenko, A., Chigrin, D., Neshev, D., Jagadish, C., Kivshar, Y., "Electro-optical switching by liquid-crystal controlled metasurfaces", Optics Express, (Apr. 8, 2013), pp. 8879-8885, vol. 21, No. 7.

Waters, R. F., Hobson, P. A., MacDonald, K. F., Zheludev, N. I., "Optically switchable photonic metasurfaces", Applied Physics Letters, (Aug. 24, 2015), 5 pages, vol. 107, No. 081102.

Yao, Y., Shankar, R., Kats, M., Song, Y., Kong, J., Loncar, M., Capasso, F., "Electrically Tunable Metasurface Perfect Absorbers for Ultrathin Mid-Infrared Optical Modulators", Nano Letters, (Oct. 13, 2014), pp. 5526-6532 , vol. 14, [online], [retrieved on Oct. 23, 2020], Retrieved from the Internet <https://doi.org/10.1021/nl503104n>.

Park, J., Kang, J. H., Liu, X., Brongersma, M. L., "Electrically Tunable Epsilon-Near-Zero (ENZ) Metafilm Absorbers", Scientific Reports, (Nov. 9, 2015), 9 pages, vol. 5, 15754.

Olivieri, A., Chen, C., Hassan, S., Lisicka-Skrzek, E., Tait, R. N., Berini, P., "Plasmonic Nanostructured Metal-Oxide-Semiconductor Reflection Modulators", Nano Letters, (Mar. 2, 2015), pp. 2304-2311, vol. 15, [online], [retrieved on Oct. 23, 2020], Retrieved from the Internet <doi.org/10.1021/nl504389f>.

Jun, Y. C., Reno, J., Ribaudo, T., Shaner, E., Greffet, J. J, Vassant, S., Marquier, F., Sinclair, M., Brener, I., "Epsilon-Near-Zero Strong Coupling in Metamaterial-Semiconductor Hybrid Structures", Nano Letters, (Oct. 14, 2013), pp. 5391-5396, vol. 13, [online], [retrieved on Oct. 23, 2020], Retrieved from the Internet <https://doi.org/10.1021/nl402939t>.

Yao, Y., Shankar, R., Kats†, M. A., Song, Y., Kong, J., Loncar, M., Capasso, F., "Electrically Tunable Metasurface Perfect Absorbers for Ultrathin Mid-Infrared Optical Modulators", Nano Letters, (Oct. 13, 2014), pp. 5526-6532, vol. 14, [online], [retrieved on Oct. 23, 2020], Retrieved from the Internet <https://doi.org/10.1021/nl503104n>.

Russell, P., "Photonic crystal fibers", Science, (Jan. 17, 2003), pp. 358-362, vol. 299, [online], [retrieved on Oct. 23, 2020], Retrieved from the Internet <https://doi.org/10.1126/science.1079280>.

Birks, T. A., Knight, J. C., Russell, P. S., "Endlessly single-mode photonic crystal fiber", Optics Letters, (Jul. 1, 1997), pp. 961-963, vol. 22, No. 13.

Valtna-Lukner, H., Repan, J., Valdma, S. M., Piksarv, P., "Endlessly single-mode photonic crystal fiber as a high resolution probe", Applied Optics, (Nov. 20, 2016), pp. 9407-9411, vol. 55, No. 33.

Reeves, W. H., Skryabin, D. V., Biancalana, F., Knight, J. C., Russell, P. S., Omenetto, F. G., Efimov, X., Taylor, A. J., "Transformation and control of ultra-short pulses in dispersion-engineered photonic crystal fibres", Nature, (Jul. 31, 2003) pp. 511-515, vol. 424.

Zhang, Z., Senel, C., Hamid, R., Ilday, F. O., "Sub-50 fs Yb-doped laser with anomalous-dispersion photonic crystal fiber", Optical Letters, (Mar. 15, 2013), pp. 956-958, vol. 38, No. 6.

Biancalana, F., Skryabin, D. V., Russell, P. S., "Four-wave mixing instabilities in photonic-crystal and tapered fibers", Physical Review, (Oct. 13, 2003), 8 pages, vol. 68.

(56) References Cited

OTHER PUBLICATIONS

Skryabin, D. V., Luan, F., Knight, J. C., Russell, P. S., "Soliton self-frequency shift cancellation in photonic crystal fibers", Science, (Sep. 19, 2003), pp. 1705-1708, vol. 301, [online], [retrieved on Oct. 23, 2020], Retrieved from the Internet <https://doi.org/10.1126/science.1088516>.

Kim, S. E., Kim, B. H., Lee, C. G., Lee, S., Oh, K., Kee, C. S., "Elliptical defected core photonic crystal fiber with high birefringence and negative flattened dispersion", Optics Express, (Jan. 16, 2012), pp. 1385-1391, vol. 20, No. 2.

Yang, T., Wang, E., Jiang, H., Hu, Z., Xie, K., "High birefringence photonic crystal fiber with high nonlinearity and low confinement loss" Optics Express, (Apr. 6, 2015), pp. 8329-8337, vol. 23, No. 7.

Vogl, U., Peuntinger, C., Joly, N. Y., Russell, P. S., Marquardt, C., Leuchs, G., "Atomic mercury vapor inside a hollow-core photonic crystal fiber", Optics Express, (Nov. 17, 2014), pp. 29375-29381, vol. 22, No. 24.

Frosz, M. H., Nold, J., Weiss, T., Stefani, A., Babic, F., Rammler, S., Russell, P. S., "Five-ring hollow-core photonic crystal fiber with 1.8 dB/km loss", Optics Letters, (Jul. 1, 2013), pp. 2215-2217, vol. 38, No. 13, Optical Society of America.

Ghenuche, P., Rammler, S., Joly, N. Y., Scharrer, M., Frosz, M., Wenger, J., Russell, P. S., Rigneault, H., "Kagome hollow-core photonic crystal fiber probe for Raman spectroscopy", Optics Letters, (Nov. 1, 2012), pp. 4371-4373, vol. 37, No. 21.

Menard, J. M., Russell, P. S., "Phase-matched electric-field-induced second-harmonic generation in Xe-filled hollow-core photonic crystal fiber", Optics Letters, (Aug. 1, 2015), pp. 3679-3682, vol. 40, No. 15.

Jiang, X., Euser, T. G., Abdolvand, A., Babic, F., Tani, F., Joly, N. Y., Travers, J. C., Russell, P. S., "Single-mode hollow-core photonic crystal fiber made from soft glass", Optics Express, (2011), pp. 15438-15444, vol. 19, No. 16.

Lee, H. W., Schmidt, M. A., Uebel, P., Tyagi, H., Joly, N. Y., Scharrer, M., Russell, P. S., "Optofluidic refractive-index sensor in step-index fiber with parallel hollow micro-channel", Optics Express, (2011), pp. 8200-8207, vol. 19, No. 9.

Tyagi, H. K., Lee, H. W., Uebel, P., Schmidt, M. A., Joly, N., Scharrer, M., Russell, P. S., "Plasmon resonances on gold nanowires directly drawn in a step-index fiber", Optics Letters, (2010), pp. 2573-2575, vol. 35, No. 15.

Lee, H. W., Schmidt, M. A., Russell, R. F., Joly, N. Y., Tyagi, H. K., Uebel, P., Russell, P. S. J., "Pressure-assisted melt-filling and optical characterization of Au nano-wires in microstructured fibers", Optics Express, (2011), pp. 12180-12189, vol. 19, No. 12.

Faez, S., Lahini, Y., Weidlich, S., Garmann, R. F., Wondraczek, K., Zeisberger, M., Schmidt, M. A., Orrit, M., Manoharan, V. N., "Fast, Label-Free Tracking of Single Viruses and Weakly Scattering Nanoparticles in a Nanofluidic Optical Fiber", ACS Nano, (2015), pp. 12349-12357, vol. 9, (2015) [online], [retrieved on Oct. 30, 2020], Retrieved from the Internet <https://doi.org/10.1021/acsnano.5b05646>.

Tuniz, A., Chemnitz, M., Dellith, J., Weidlich, S., Schmidt, M. A., "Hybrid-Mode-Assisted Long-Distance Excitation of Short-Range Surface Plasmons in a Nanotip-Enhanced Step-Index Fiber", Nano Letters, (2017), pp. 331-637, vol. 17.

\* cited by examiner

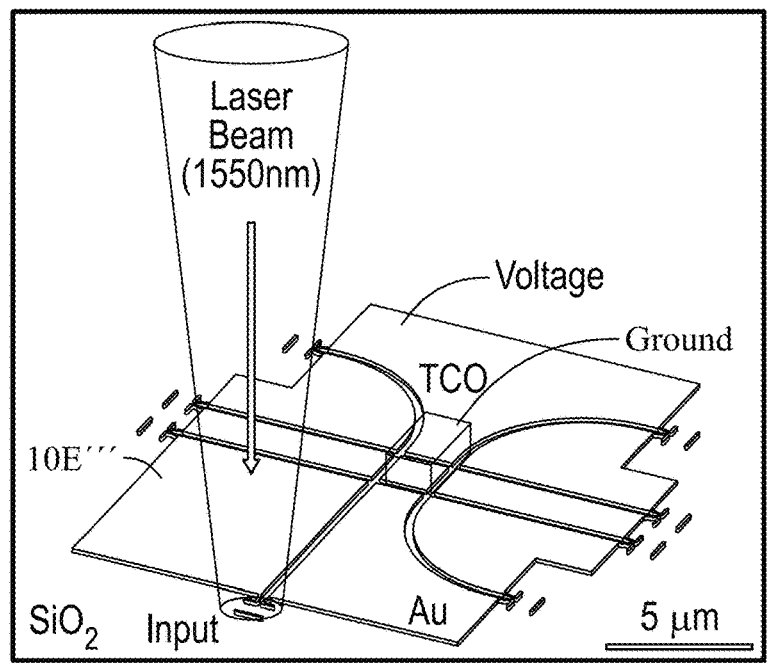
FIG. 11A
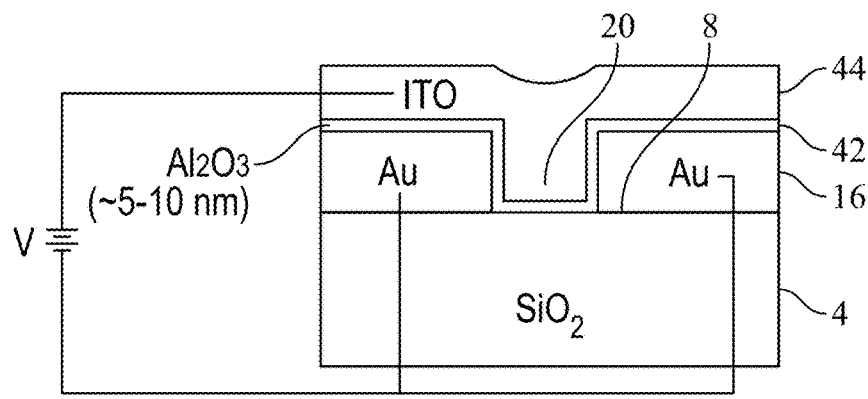
FIG. 11B
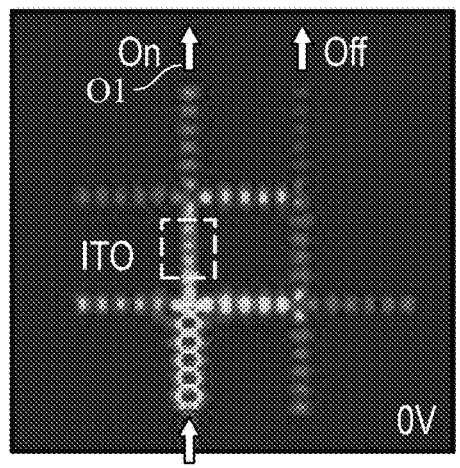 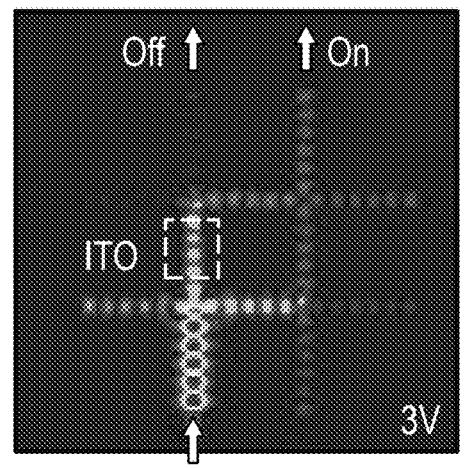
FIG. 11C     FIG. 11D

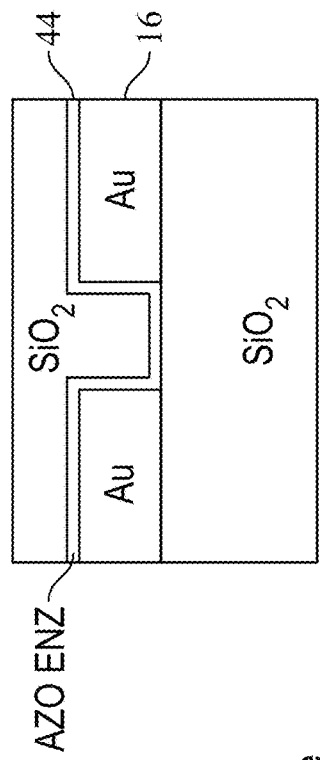
FIG. 12B
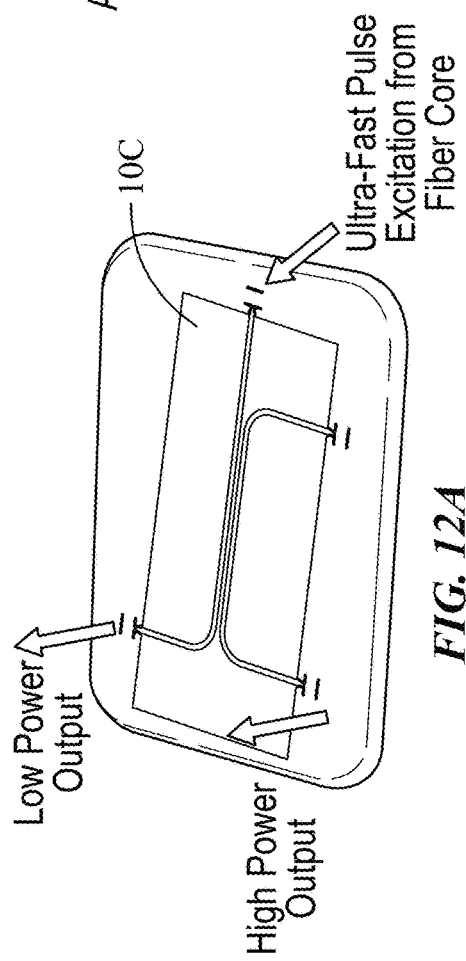
FIG. 12A
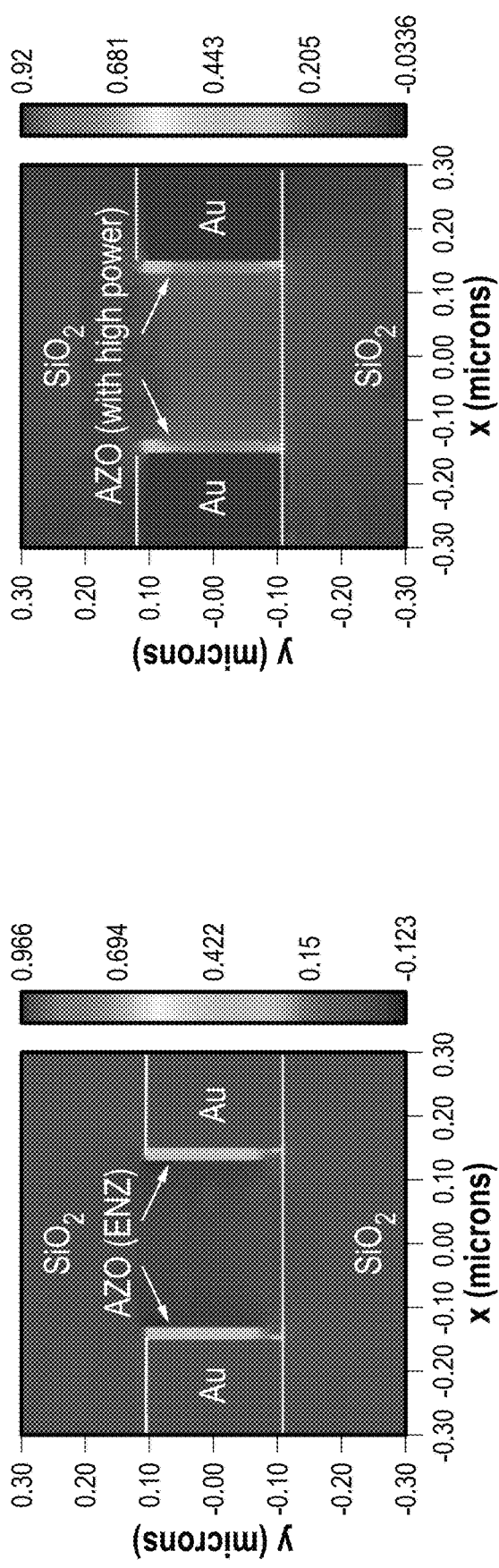
FIG. 12D
FIG. 12C

TUNABLE NANOCIRCUIT AND WAVEGUIDE SYSTEM AND METHOD ON OPTICAL FIBER

CROSS REFERENCE TO RELATED APPLICATIONS

This application claims the benefit of U.S. Provisional Application No. 63/032,050, entitled "Tunable nanophotonic waveguide system and method", filed May 29, 2020, which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to optical fiber. More specifically, the disclosure relates to optical fiber and plasmonics with related devices, circuitry, and methods.

Description of the Related Art

Optical fiber is well-known example of a way to guide and manipulate light. It has been used extensively in various applications including long distance optical communication, light generation using fiber lasers, remote and optical sensing, fiber imaging in endoscopes, and fiber laser surgery. The increased use of optical technologies to improve computing and communication techniques is resulting in new innovative fabrication and integration of devices that contain different elements and novel compound combinations. One area is harnessing plasmonics to achieve the twin goals of achieving optical speeds without sacrificing electronic miniaturization. Plasmonics involves using different properties of light and electrons—such as the wave propagation property to capture effects that are not possible if the particle property is emphasized in the application. Developing components such as switches and other types of devices that utilize the ability of light to excite electrons and create plasmons is a key step towards the fabrication of commercially usable plasmonic circuits.

The continuous demand for faster optical signal transportation and smaller devices is driving the development of on-chip photonic devices and circuits. However, with the diffraction limit, dielectric photonic devices cannot be reduced to a size comparable to the semiconductor components in the computer's processors. In contrast, the electronic interconnection in a processor has a limitation on speed because of the thermal and resistive-capacitive (RC) delay time issues. A "photonic" approach, such as silicon photonic, is one of the promising solutions for chip-to-chip and on-chip interconnections, as photonics provides high bandwidth data transmission, low power consumption, and no cross-talk communication. However, an obstacle is that the size of photonic devices has been largely limited by diffraction, meaning that light cannot be guided in an optical waveguide with a dimension less than half of the wavelength, strongly restricting the development of photonic circuits at the nanometer scale.

Plasmonics offer light guiding below the diffraction limit while still maintaining a high optical bandwidth, providing a different solution of nanoscale light wave processing. Surface plasmon polaritons (plasmonic waves) are electromagnetic waves propagating along the interface between metal and dielectric media with nanoscale light confinement far below the diffraction limit of light. A wide variety of plasmonic waveguides and devices has been realized to form the building block of a chip-based plasmonic system, such as the plasmonic stripe, wedge, slot, or nanowire waveguides, splitters and multiplexers, interconnect, and so on.

However, to date there is no simple and efficient way to couple light from a diffraction-limited waveguide into the highly confined mode in plasmonic nanostructures or nanocircuits while maintaining the photonic functionalities. Several attempts have been made to obtain efficient light coupling between the plasmonic mode and optical fiber mode, including using grating coupling and end-fire coupling with lenses, processors, free space transmission, scattering light, and collecting scattered light, and other steps and components. Those schemes required sophisticated nanofabrication and optical alignment and the demonstrated systems prior to the present invention do not exhibit multi-functionality. In addition, an active version of plasmonic circuits with arbitrary control of phase and amplitude of individual plasmonic waves by external electrical/optical modulation appears to be an as-yet unrealized milestone.

Attempts have been made to fabricate plasmonic components on optical fiber facets so that the plasmonic elements can interact directly with the fiber. Such attempts generally have been coating an optical fiber end with a metal such as gold to support a plasmonic mode, but not a waveguide or circuit. The plasmonic elements can interact directly with a well-guided spatial mode pattern in the fiber. Compact optical components such as diffraction grating, optical tweezers, and plasmonic sensors have been realized with periodical metallic nanostructures (i.e., slits, holes, and bars) on the facets of conventional fibers. However, those on-fiber plasmonic nanostructures are limited to the excitation of localized plasmons that do not propagate, thus restricting the potential applications of the plasmonic optical fiber. In addition, most of the reported plasmonic elements on fiber are passive, and thus the optical functions cannot be altered after fabrication.

Therefore, there is a need to integrate new materials and new plasmonic nanostructures into optical fiber for enhanced processing and transmission capabilities and novel functionalities.

BRIEF SUMMARY OF THE INVENTION

The present disclosure provides devices, systems including circuits, and effective methods for designing advanced optical applications using plasmonics and novel epsilon near zero (ENZ) index materials-based optical fiber applications. The disclosure provides for enhancement of the optical tunability of phase and amplitude of propagating plasmons, nonlinear-optical effects, and resonant network in optical fiber tip nanocircuits and integrates the tunable plasmonic and ENZ material effects for novel in-fiber applications. The integration of the optical and electrical functionalities of the plasmonic nanocircuit design and ENZ material properties expands the functionalities of optical fiber with high operating speed and low power consumption. The invention yields efficient coupling of a plasmonic functional chip directly on the facet of optical fiber core using among other methods focused ion beam and electron beam lithography techniques. The invention also can use gate-tunable ENZ materials to electrically and nonlinear optically tune the plasmonic nanostructures and resonant guided wave circuits for advanced light manipulation. The invention efficiently integrates and manipulates the voltage-tuned ENZ resonance for phase and amplitude modulation in on-fiber nanocircuits. With the phase flexibility and functionality of plasmonic structures, in-fiber optical components such as a filter and amplifier, linear polarizer, focusing lens, and efficient fiber optical tweezer can be enhanced.

The disclosure provides a nanocircuit device, comprising: a first optical fiber formed with a facet; and a nanocircuit integrally formed on the facet, the nanocircuit comprising: a nanocoupler configured to directly couple light energy from the first optical fiber with plasmonic energy on the nanocircuit; and at least one waveguide formed in the nanocircuit and coupled to the nanocoupler, the waveguide configured to conduct plasmonic energy on the nanocircuit.

The disclosure further provides a method of manufacturing a nanocircuit device, comprising: providing an optical fiber formed with a facet; depositing a metal layer on the facet; milling a slot into the metal layer on the facet and configured to form a waveguide; and milling a nanocoupler into the metal layer on the facet and configured to directly couple light energy from the optical fiber with plasmonic energy in the waveguide.

BRIEF DESCRIPTION OF THE SEVERAL VIEWS OF THE DRAWINGS

FIG. 11A is a schematic of an example of a tunable RGWN nanocircuit.

FIG. 11B is a schematic of a corresponding transparent conducting oxide (TCO) waveguide.

FIG. 11C illustrates a simulated response with an applied bias.

FIG. 11D illustrates a simulated response without an applied bias, showing the ultrafast switching capability.

FIG. 12A is a schematic of an exemplary tunable ENZ/plasmonic directional coupler nanocircuit for nonlinear optical switching.

FIG. 12B is a schematic of an exemplary corresponding TCO waveguide of the directional coupler of FIG. 11A.

FIG. 120 shows a simulated field profile of the ENZ/plasmonic directional coupler with low excitation power.

FIG. 12D shows a simulated field profile of the ENZ/plasmonic directional coupler with high excitation power.

FIG. 130 is a schematic illustrating an exemplary tunable optical fiber ENZ nanocircuit with a multicore fiber to provide a plurality of inputs to the nanocircuit.

DETAILED DESCRIPTION

Figure 1:
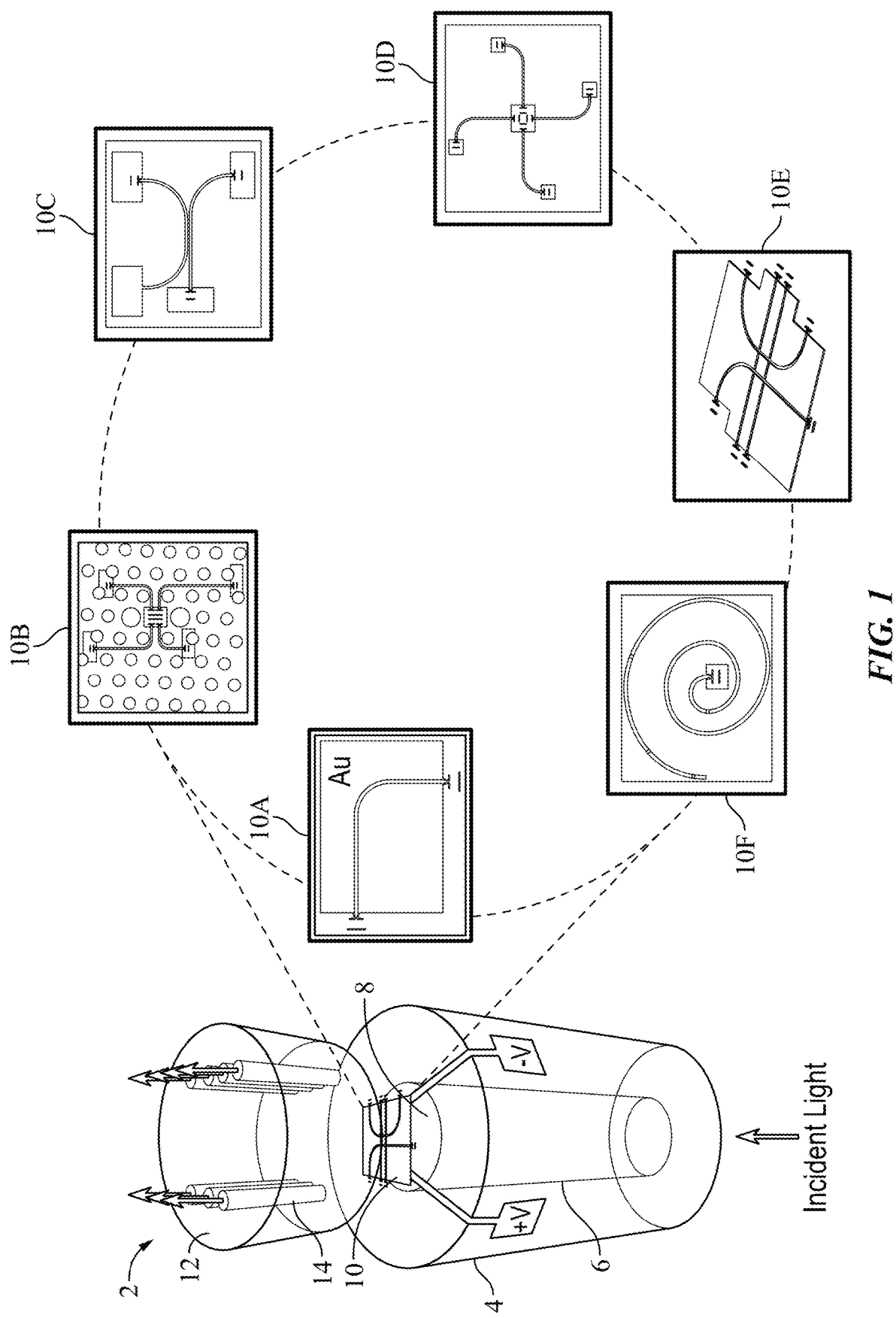
FIG. 1 is a schematic overview of an embodiment of a nanocircuit system according to the present invention.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a processor would encompass a processing system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein.

In general, the disclosure provides effective methods for designing advanced optical applications using plasmonics and novel ENZ materials-based optical fiber applications. The invention in at least one aspect integrates optoelectronic tunable plasmonic nanocircuits and devices into optical fiber tips for advanced light manipulation and communication. The invention can yield efficient coupling of a plasmonic functional chip directly on the facet of optical fiber core via various techniques, including focused ion beam and electron beam lithography techniques. The invention can also use gate-tunable ENZ materials to electrically and nonlinear optically tune the plasmonic nanostructures and resonant guided wave circuits for advanced light manipulation.

In the invention, optical fiber tips with a plasmonic nanocircuit can be made for light manipulation. However, known previously reported plasmonic structures are limited to the excitation of localized plasmonics, thus restricting the ability for manipulation of the plasmonic wave and consequently the functionality of the nanostructure-enhanced plasmonic optical fiber. The present invention can provide sophisticated plasmonic nanocircuits with tunability to advance the plasmonic optical fiber functionality.

FIG. 1 is a schematic overview of an embodiment of a nanocircuit system according to the present invention. FIG. 1 illustrates nanocircuit system 2 having an optical fiber 4 with at least one core 6 with a facet 8. A nanocircuit 10 is formed on the optical fiber facet 8 and therefore integral with the optical fiber for coupling with the facet, where the optical fiber 4 provides input energy to the nanocircuit. In at least some embodiments, another optical fiber 12 is coupled to the nanocircuit to receive energy from the nanocircuit and emit the energy through one or more output ports 14 in the optical fiber 12. Exemplary nanocircuits 10A-10F are shown in the expanded view of the nanocircuit 10. Without limitation, such examples can include modulators/waveguides 10A, light distributors 10B, directional couplers/demultiplexers 100, guided wave resonators/routers 10D, polarization couplers 10E, and complex structures 10F. The disclosure provides a tunable nanocircuit that can provide features such as light switching, multiplexing/demultiplexing, directional coupling, routing, and resonant/sensing effects. For purposes herein, the term "nano" is meant to include individual devices up to 1000 nm and more particularly up to a few hundred nm. These tunable nanocircuit optical fiber tips can result in novel communication and optical and/or biological sensing devices. The disclosure provides complex plasmonic nanocircuits such as a gap plasmonic waveguide, multi-channel plasmonic waveguide, plasmonic directional coupler, and resonant guided wave network directly on the facet of the optical fiber, that being the facet of the optical fiber. The nanocircuits can be manufactured on the facet using for example focused ion beam milling and electron beam lithography techniques. Deposition of materials on the facet can include using an atomic layer deposition (ALD) technique to deposit for example transparent conducting oxides (TCO) or metallic nitrides epsilon-near-zero (ENZ) materials for the plasmonic nanocircuits. The ENZ materials can be used to enable efficient excitation of gate-tunable ENZ modes on the optical fiber circuits. Electrical bias can actively control the plasmonic/ENZ nanostructures on the fiber for achieving multifunctionality. The disclosure also provides utilizing enhanced ENZ nonlinearity features to control the plasmonic/ENZ hybrid circuits for efficient non-linear optical switching and manipulation. The invention can utilize the electronic and optical switching functionality to design optical networks, and routing and functional devices to be integrated into the optical fiber tip. Further, the disclosure provides for enhancing the quantum and Raman emission effects by exciting emitter/molecules with the ENZ mode in a conducting oxide/metallic nitride active layer with a plasmonic/ENZ nanocircuit. The results of the underlying principles taught in this disclosure can be shown in a few non-limiting examples.

The optimized configuration provides direct coupling from optical fiber to plasmonic nanocircuits without requiring bulky optical components. This ability reduces the need of chip-chip configurations and even fiber-chip configurations and moves in a direction of combining these integrated circuits directly on the fiber facet. The disclosure provides a compact in-fiber device that consists of plasmonic nanocircuits on the fiber tip. These devices will potentially reduce the complexity of photonic integrated circuit (PIC) (also known as "integrated optical circuit" and provide a stand-alone optical system that allows light coupling in and out of the nanocircuits for signal processing within the plasmonic nanocircuits. Embodiments provided herein shows the fabrication technology in the fiber facet for unique plasmonic network on the tip of optical fiber to exemplify how the patterning of the circuits can lead to the incorporation of compact optical circuits on fibers.

Figure 2:
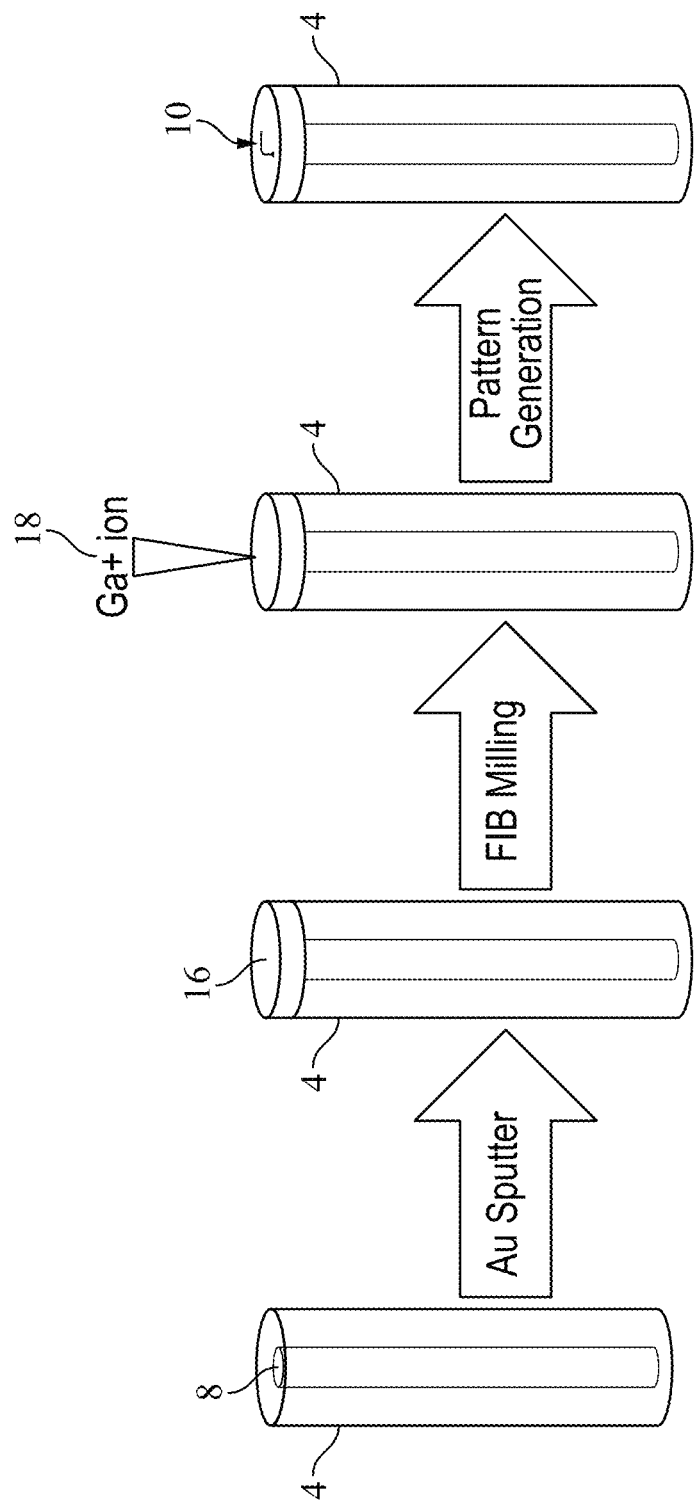
FIG. 2 is a schematic illustration of a fabrication process for creating an integrated nanocircuits on an optical fiber facet (herein, also referenced as a "tip").

FIG. 2 is a schematic illustration of a fabrication process for creating an integrated nanocircuit on an optical fiber facet (herein, also referenced as a "tip"). For example, polarization-maintaining photonic crystal fibers (PCF) and panda-shaped (PS) optical fibers 4 can be used for these nanocircuits. The facet 8 is first cleaved, and a conductive layer 16, such as a ~200 nm thick metal layer such as a gold layer, can be deposited on the facet of the fiber via an RF magnetron sputtering machine with a chamber pressure of 10-3 torr or thermal evaporation techniques. The gold deposited fiber 4 can be taken to a dual-beam focused ion beam scanning electron microscopy (FIB-SEM) or other suitable processing system 18 for further processing and fabrication of the nanocircuits 10. The fibers can be attached to a holder vertically so that the tip of the fiber is flat over the cross-sectional surface and the fiber is not tilted. The fiber facet can be positioned in such a way that the center of the core of the fiber is correlated with a chosen designed pattern.

The nanocircuits can be patterned on, for example, conventional panda-shaped polarization-maintaining optical fiber. These fibers have two big lobes of higher refractive index material that surrounds the solid core on either side. Another example is photonic crystal fiber (PCF), including polarization-maintaining PCF (PM-PCF). A focused ion beam (FIB) can mill the optical fiber. Electron beam lithography can also be used to fabricate the nanostructures with small feature sizes (e.g. <100 nm). A Ga+ ion stream in the FIB can used to directly mill the nanostructures on the fiber. An applied voltage of 30 kV and ion beam current of 10 pA can be used for the fabrication process.

Figure 3A:
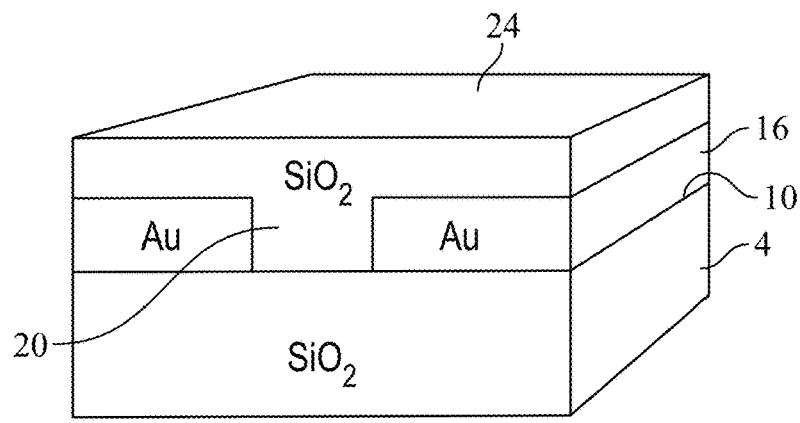
FIG. 3A is a schematic of an exemplary optical fiber nanocircuit having a slot plasmonic waveguide with an antenna.
Figure 3B:
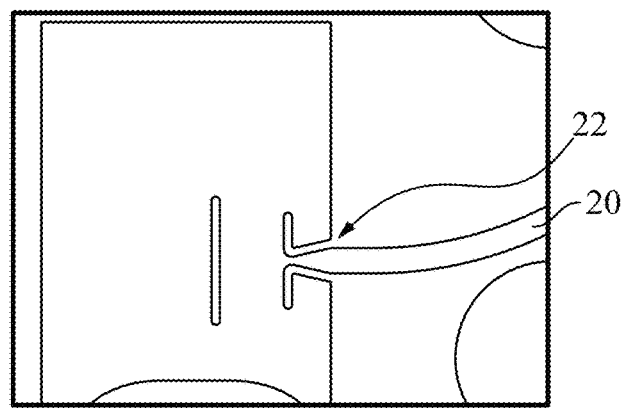
FIG. 3B is a schematic of an exemplary antenna for coupling the optical fiber mode to the plasmonic slot waveguide mode.
Figure 3C:
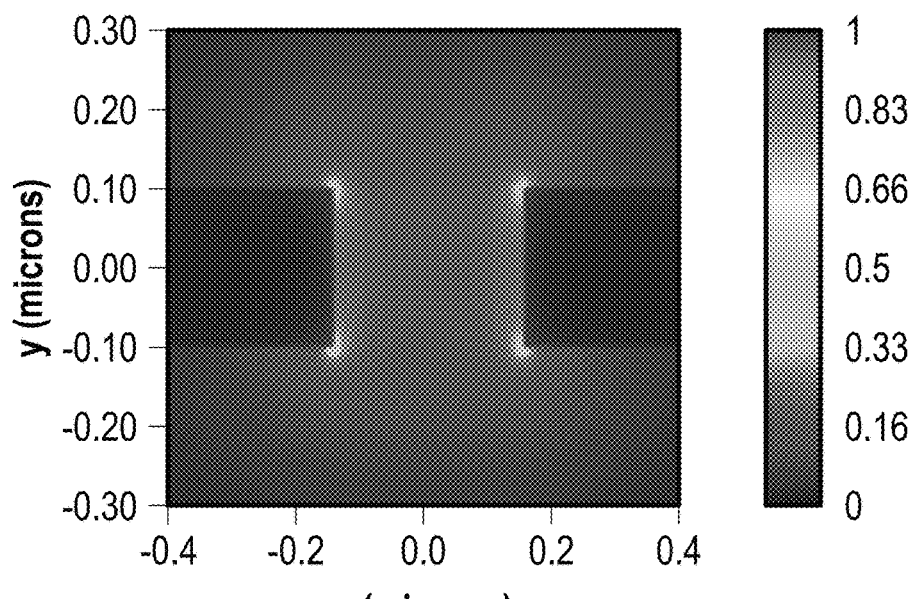
FIG. 3C is a schematic of a vertical profile of the plasmonic slot waveguide mode illustrated in FIG. 3A showing an electric field component of light in the slot.

FIGS. 3A-3C is illustrates is a graphical depiction of schematics and electron microscopic photographs for efficient coupling of an optical fiber mode to a plasmonic slot waveguide mode with an antenna. FIG. 3A is a schematic of an exemplary optical fiber nanocircuit having a slot plasmonic waveguide. FIG. 3B is a schematic of an exemplary antenna for coupling the optical fiber mode to the plasmonic slot waveguide mode. FIG. 3C is a schematic of a vertical profile of the plasmonic slot waveguide mode illustrated in FIG. 3A showing an electric field component of light in the slot. The conductive layer 16 can be milled to form a slot 20 in the layer. An antenna 22, shown in FIG. 3B, can be used to efficiently couple an electromagnetic signal as light through the optical fiber into a plasmonic slot waveguide and to achieve narrow directionality. Although not shown, other nanocouplers such as plasmonic grating couplers, plasmonic waveguide tapers, and nanoparticle couplers can be used. An antenna is can convert the mode with high efficiency. A bow-tie antenna has been shown to have a 10% coupling efficiency. A Yagi-Uda antenna has been shown to have 45% in-coupling efficiency and 60% emission efficiency from the slot waveguide into the air and the substrate and is generally used for the illustrative nanocircuits herein. The relative dimensionality of the fabricated Yagi-Uda antenna can be seen from FIG. 3B, where the gap between the two dipole antenna components and the width of the waveguide are close to the intended design of 80 nm and 300 nm, respectively. The antenna coupling allows direct coupling of a forward propagating core mode to the plasmonic nanostructures without conventional complicated prism coupling. Coupling efficiency of 15% and 45% can occur to silica-cladded Au waveguides from air and silica, respectively. The components of such an antenna include a two-dipole antenna, and each of them is connected to the plasmonic waveguide slot via a feeding element. A passive element, the reflector, sits on the back of the dipole antenna that further enhances the feeding mechanism into the waveguide. The length of the antenna can be chosen so that the antenna has maximum coupling efficiency at 1550 nm. In at least one embodiment, the core light of the fiber can be coupled to the plasmonic slot waveguide by fabricating the nanocircuits near the core region of the fiber. A thick silica glass layer 22, such as 400 nm thick, be deposited on top of the structures for symmetric coupling.

The sample can be then measured with a far-field measurement setup. Measured optical images show the detection of a significant amount of emitted light from the output antenna, implying good coupling and propagation of a surface plasmon polariton (SPP) guided mode in the plasmonic slot waveguide shown in FIG. 3C.

Figure 4A:
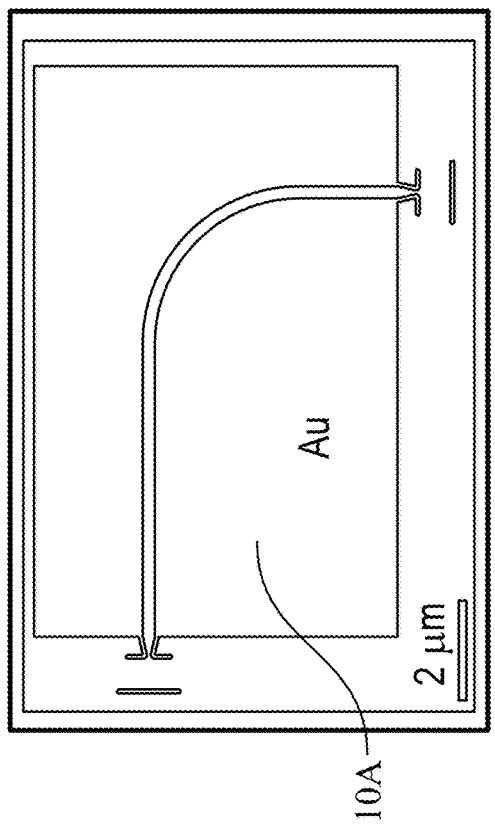
FIG. 4A is a SEM image of an exemplary plasmonic slot waveguide nanocircuit on an optical facet.
Figure 4B:
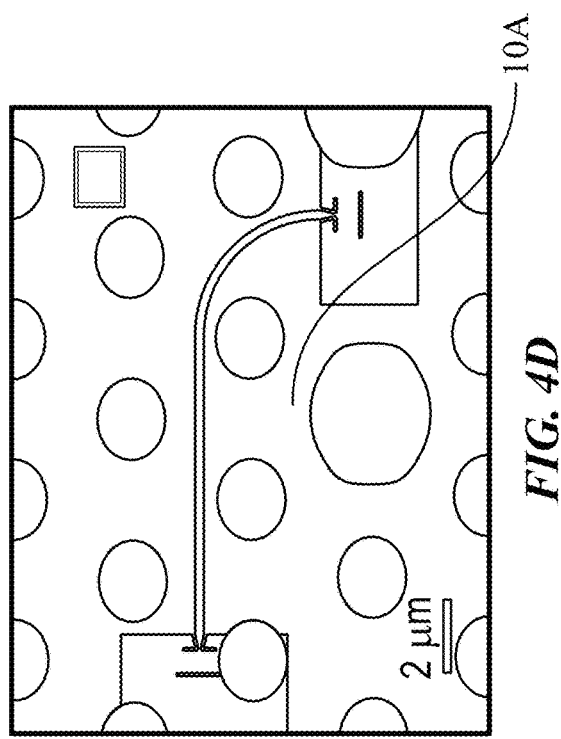
FIG. 4B is an enlarged SEM image of the waveguide of FIG. 4B.
Figure 4C:
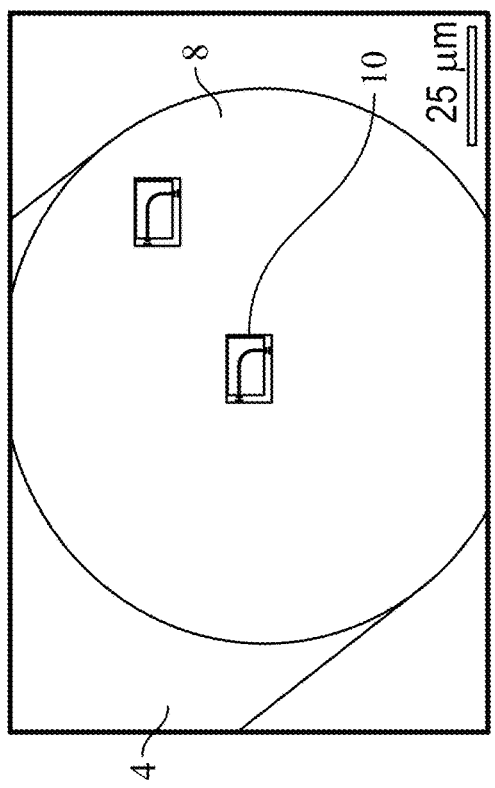
FIG. 4C is an SEM image of another exemplary plasmonic slot waveguide on an optical facet.
Figure 4D:
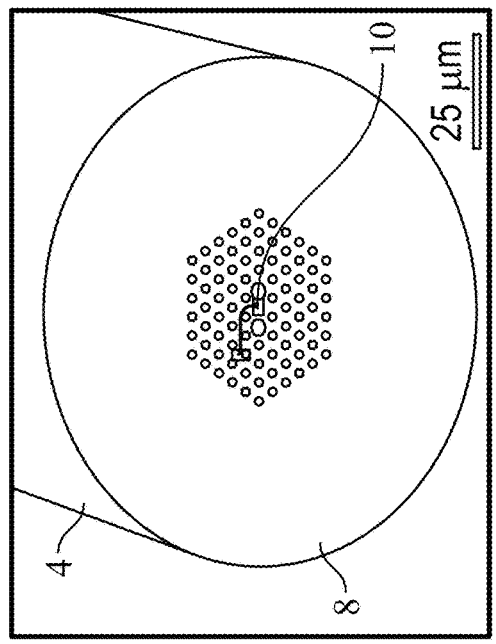
FIG. 4D is an enlarged SEM image of the waveguide of FIG. 4O.

FIG. 4A is a SEM image of an exemplary plasmonic slot waveguide nanocircuit on an optical facet. FIG. 4B is an enlarged SEM image of the waveguide of FIG. 4B. FIG. 4C is an SEM image of another exemplary plasmonic slot waveguide on an optical facet. FIG. 4D is an enlarged SEM image of the waveguide of FIG. 4C. The images show the waveguide nanocircuit 10A on the facet 8 and can be formed on conventional polarization maintaining (PM) optical fiber 4 or on PM photonic crystal fiber as examples. The 90° bend is used to turn the waveguide mode polarization for the emitting antenna, thus allowing cross-polarized far-field imaging with good signal-to-noise ratio for the desired output signal (suppressing forward propagating incident light). The PCF is used to ensure the alignment of plasmonic waveguide/antenna during nanofabrication and optical measurements. Far-field measurements show that light from the core mode can be efficiently coupled to the plasmonic waveguide mode, and the in-plane plasmonic mode can propagate and emit in the emitting antenna with orthogonal output polarization. For input core polarization orthogonal to the antenna direction, little to no light is emitted from the emitting antenna indicating the coupling of the plasmonic mode with targeted polarization state. The typical core diameters for conventional single mode fiber and photonic crystal fiber are ~4-6 μm and the Yagi-Uda antenna's size is ~1 μm. To efficiently utilizing the whole core mode area, the invention can include multiple complex structures with multiple input antenna. The total coupling efficiency to the plasmonic nanocircuits can be strongly enhanced with the sophisticated nanostructures with multiple inputs.

Figure 5A:
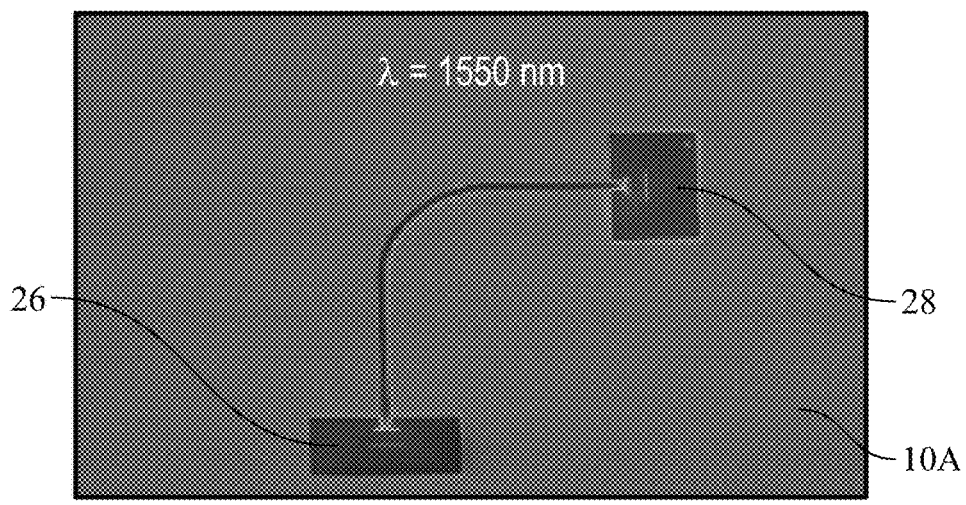
FIG. 5A is an overlapped optical image and SEM image of a waveguide nanocircuit.
Figure 5B:
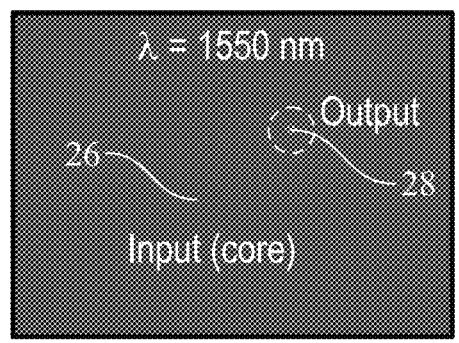
FIG. 5B is an SEM image of the waveguide and output at a wavelength of 1550 nm.
Figure 5C:
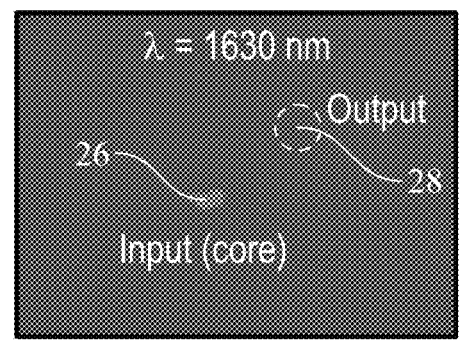
FIG. 5C is an SEM image of the waveguide and output at a wavelength of 1630 nm.
Figure 5D:
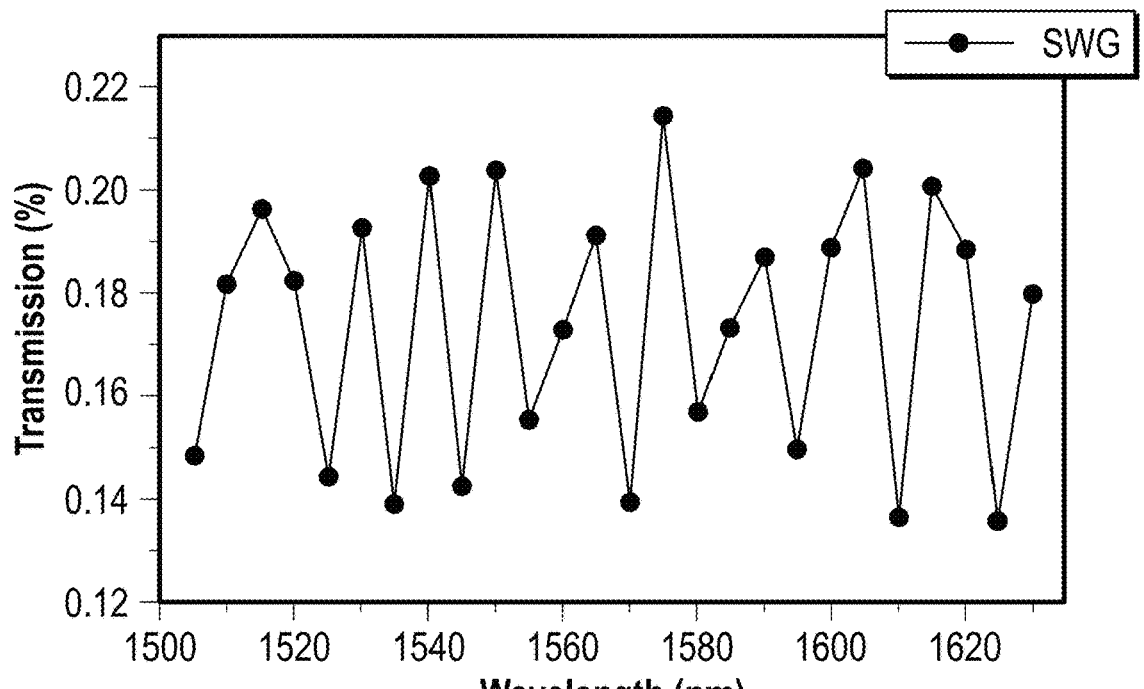
FIG. 5D is a chart illustrating an exemplary coupling efficiency of the single waveguide at a wavelength range of 1500-1630 nm.

FIGS. 5A-5D shows exemplary NIR optical camera images for incident light on a plasmonic slot waveguide nanocircuit at a wavelength of 1550 nm and 1630 nm and the associated response. FIG. 5A is an overlapped optical image and SEM image of the waveguide nanocircuit. FIG. 5B is an SEM image of the waveguide and output at a wavelength of 1550 nm. FIG. 5C is an SEM image of the waveguide and output at a wavelength of 1630 nm. FIG. 5D is a chart illustrating an exemplary coupling efficiency of the single waveguide at a wavelength range of 1500-1630 nm. In FIG. 5A, the illustrative single waveguide 10A couples light from the input antenna 26 in the input port 32 to emit light from the output antenna 28 at the output port 34 at the cladding outside the core. In FIG. 5B, at 1550 nm, the output light is brighter than the input light. In FIG. 5C, at 1630 nm, the input light is brighter than the output light. The near infrared ("NIR") images of the facet are recorded at every 5 nm step size from 1500-1630 nm. These images of the coupled output antenna are then normalized to that of a blank PS fiber of similar length with the same input laser power. This normalized data gives the coupling efficiency of the single waveguide at the wavelength range of 1500-1630 nm as shown in FIG. 5D. The result shows the total efficiency for the illustrative single waveguide (including input/output coupling, bending loss, and propagating loss) is measured to be ~0.2% in the wavelength range of 1500-1630 nm.

Figure 6A:
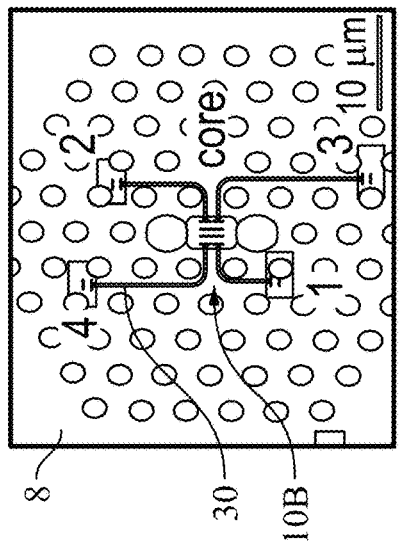
FIG. 6A is an SEM image of the multichannel waveguide nanocircuit on the optical fiber.
Figure 6B:
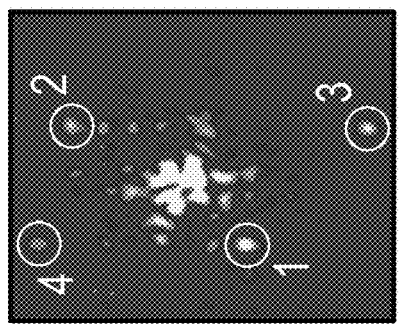
FIG. 6B is a measured far-field optical image showing four output signals.
Figure 6C:
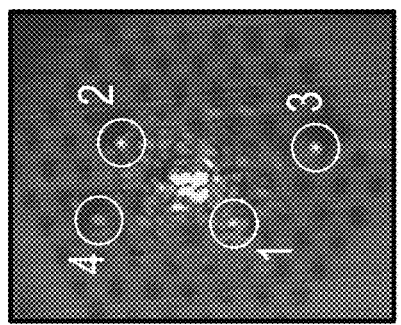
FIG. 6C is an enlarged measured far-field optical image near the core and output regions of the optical fiber.
Figure 6D:
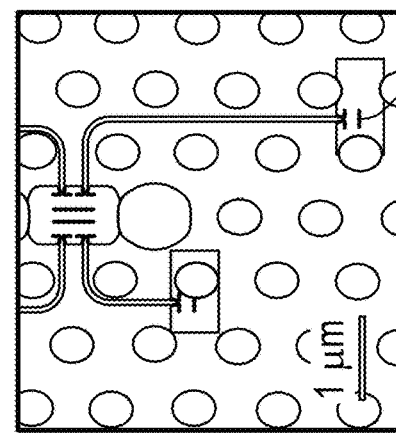
FIG. 6D is an enlarged SEM image of the multichannel waveguide nanocircuit of FIG. 6A.
Figure 6E:
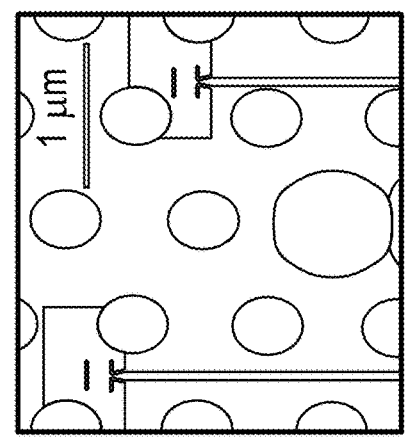
FIG. 6E is an enlarged SEM image of the multichannel waveguide nanocircuit of FIG. 6D, showing output antenna ports.
Figure 6F:
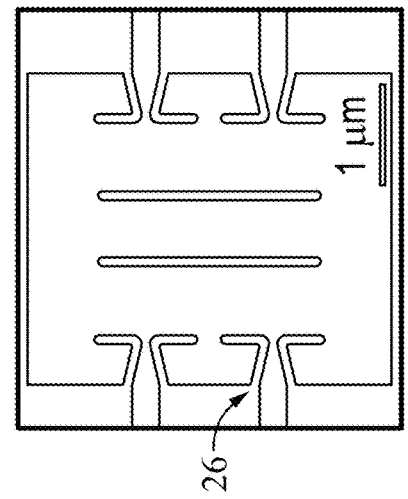
FIG. 6F is an enlarged SEM image of the multichannel waveguide nanocircuit of FIG. 6E, showing the input antennas near a core of the optical fiber.

FIGS. 6A-6I illustrate an exemplary plasmonic multichannel waveguide structure fabricated on a photonic crystal fiber and a PM-PCF fiber. FIG. 6A is an SEM image of the multichannel waveguide nanocircuit on the photonic crystal fiber optical fiber facet 8. FIG. 6B is a measured far-field optical image showing four output signals. FIG. 6C is an image near the core and output regions of the optical fiber. This example shows a nanocircuit 10A of four identical input antenna 26 and four individual waveguides 30 with different lengths (15, 12, 9, 6 μm). The measured optical image shows that the optical fiber core mode could be coupled and distributed to the four individual plasmonic waveguides with highest output intensity for the shortest waveguide and gradually decreased intensity with the longer waveguide length, shown in FIGS. 6B and 6C. The measured plasmonic waveguide loss is ~0.45 dB/μm at a wavelength of 1550 nm (by measuring the transmitted spectra for different waveguide lengths). Yagi-Uda antenna parameters (such as length, width, size of gap) can be designed for maximizing the coupling efficiency. Full-wave electromagnetic 3D simulations show that a coupling efficiency of ~6% (for non-optimized antenna) can be achieved from a 6 μm core mode to a single plasmonic waveguide with slot width of 300 nm. For example, integrating four or five input antenna will lead to total coupling efficiency of ~30%, and likely a coupling efficiency>50% by optimizing the antenna and core geometries, leading to an efficient plasmonic system on an optical fiber tip.

Figure 6H:
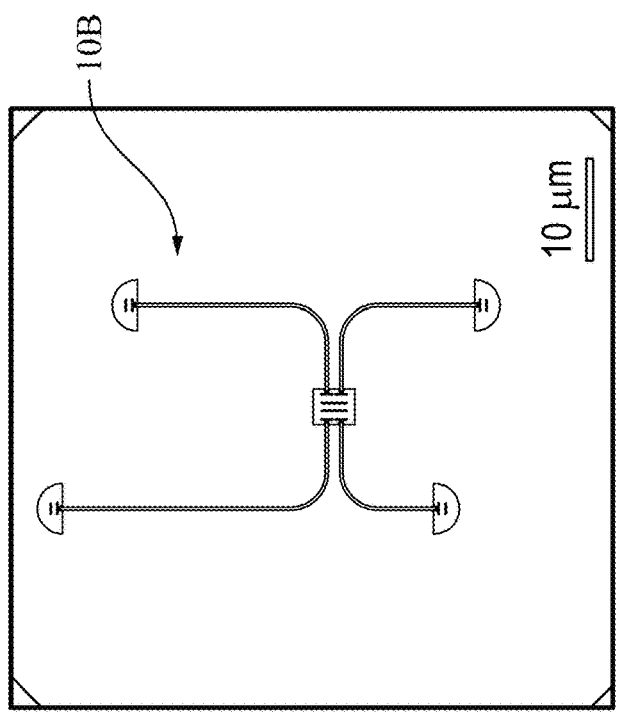
FIG. 6H is an enlarged SEM image of the multichannel waveguide nanocircuit of FIG. 6G.
Figure 6G:
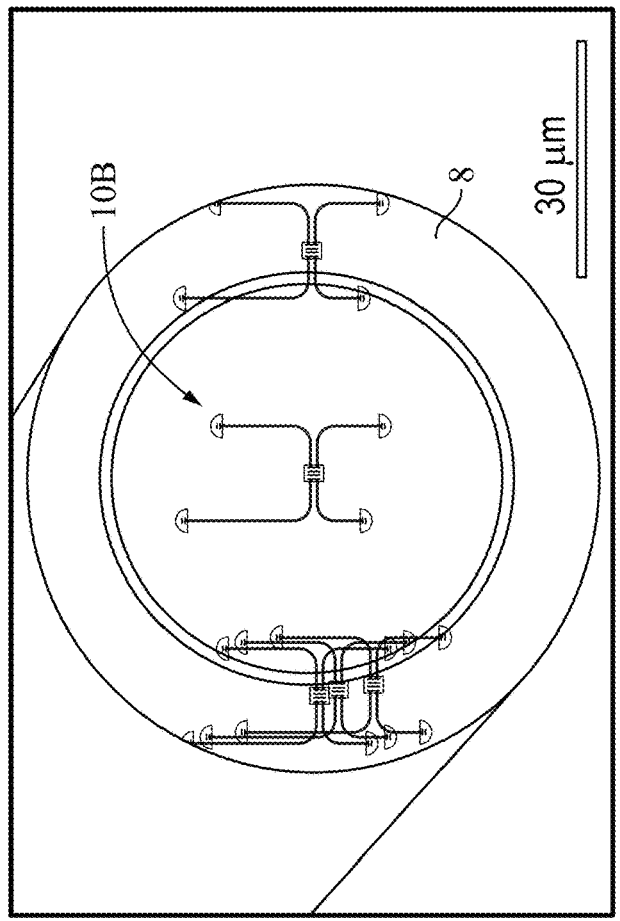
FIG. 6G is SEM image of a multichannel waveguide nanocircuit similar to the circuit of FIG. 6A but on polarization-maintaining photonic crystal fiber (PM-PCF) fiber.
Figure 6I:
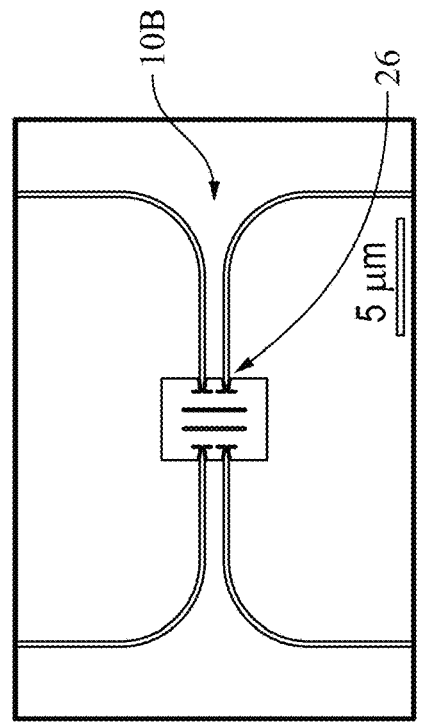
FIG. 6I is an enlarged SEM image of the multichannel waveguide nanocircuit of FIG. 6H, showing input antennas near a core of the optical fiber.

FIG. 6G is SEM image of a multichannel waveguide nanocircuit similar to the circuit of FIG. 6A but on polarization-maintaining photonic crystal fiber (PM-PCF) fiber. FIG. 6H is an enlarged SEM image of the multichannel waveguide nanocircuit of FIG. 6G. FIG. 6I is an enlarged SEM image of the multichannel waveguide nanocircuit of FIG. 6H, showing input antennas near a core of the optical fiber. The additional embodiment demonstrates the ability to form on multiple optical fibers.

Figure 7B:
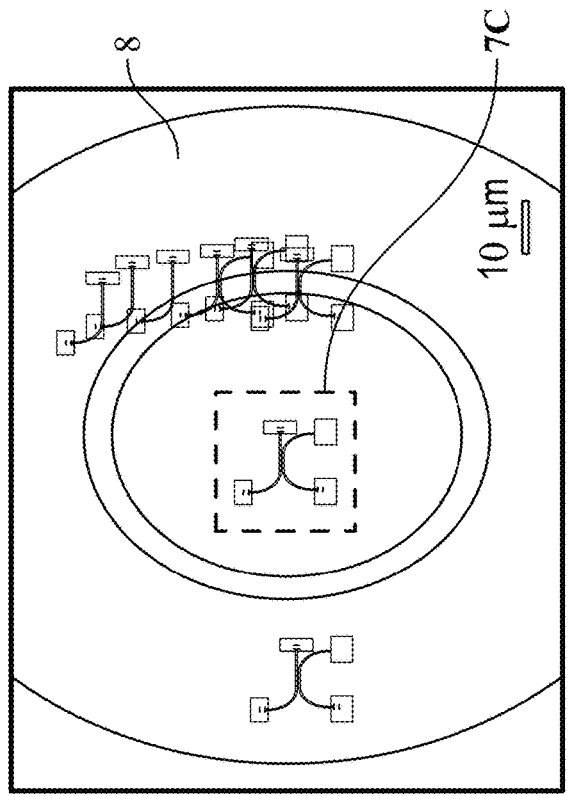
FIG. 7B is an enlarged view of the optical fiber facet after fabrication of the exemplary plasmonic directional coupler.
Figure 7A:
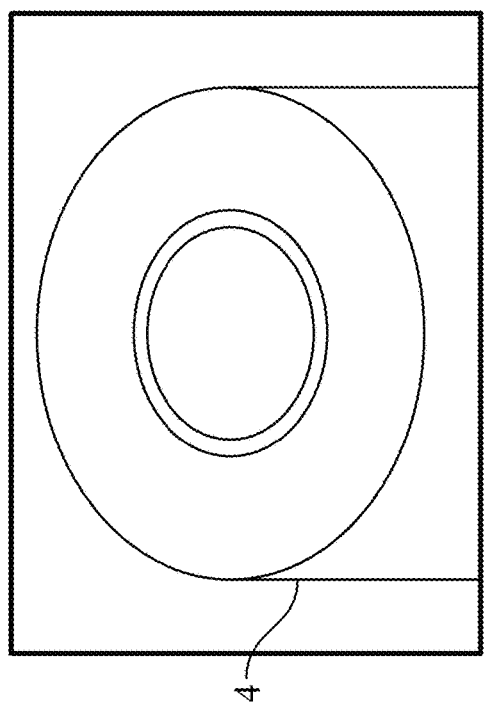
FIG. 7A is an SEM image of the optical fiber facet prior to fabrication of an integrated directional coupler nanocircuit.
Figure 7E:
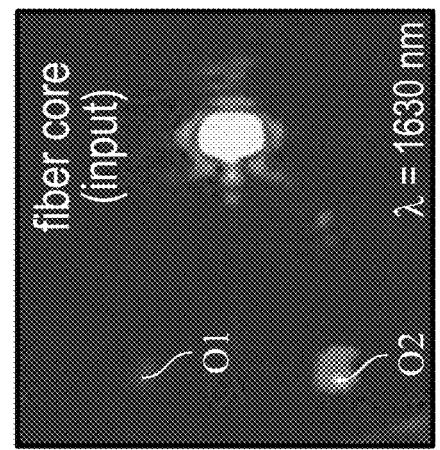
FIG. 7E is a measured far-field optical image showing the two outputs at 1630 nm.
Figure 7D:
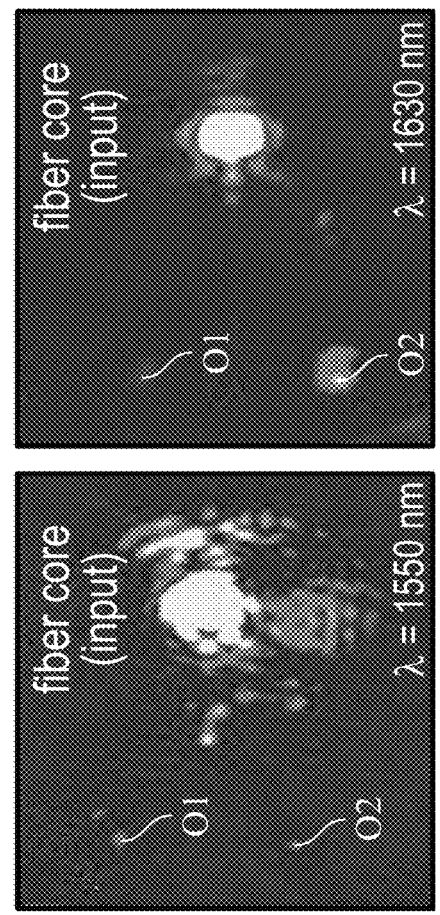
FIG. 7D is a measured far-field optical image showing the two outputs at 1550 nm.
Figure 7C:
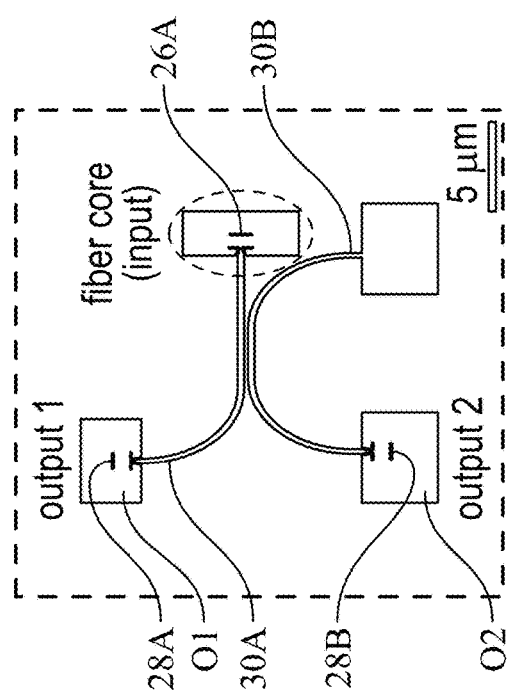
FIG. 7C is a further enlarged of the plasmonic directional coupler of FIG. 7B.

FIGS. 7A-7E illustrate an exemplary plasmonic directional coupler nanocircuit having multiple output channels fabricated on an PM optical fiber. FIG. 7A is an SEM image of the optical fiber facet prior to fabrication of the integrated direction coupler nanocircuit. FIG. 7B is an enlarged view of the optical fiber facet after fabrication of the exemplary plasmonic directional coupler. FIG. 7C is a further enlarged of the plasmonic directional coupler of FIG. 7B. FIG. 7D is a measured far-field optical image showing the two outputs at 1550 nm. FIG. 7E is a measured far-field optical image showing the two outputs at 1630 nm. The teachings herein can be used to create a plasmonic directional coupler nanocircuit 100. As an example, the plasmonic directional coupler can be created on a facet 8 of a PANDA-type PM-optical fiber 4, shown in the SEM images of FIGS. 7A and 7B. The invention provides optical switching properties with such plasmonic directional couplers. The plasmonic optical directional coupler includes two adjacent waveguides 30A and 30B, wherein one single waveguide runs parallel to another waveguide along a horizontal section of each waveguide. (In FIGS. 7A and 7B, a circular ring was etched to help identifying the "panda" structure in the cladding, so that the structure could be fabricated according to the slow/fast axis of the PM fiber for cross-polarization far-field detection.) In this example, the two slot waveguides 30A and 30B have a 300 nm width with a separation between waveguides of 80 nm, and coupling length of 3 µm. The Yagi-Uda antennas at the input antenna 26A and output antenna 28A are tailored for the single slot waveguide 30A with a length of 22 µm (horizontal portion) and a 6 µm vertical slot waveguide section connected to the output antenna. The other slot waveguide 30B that runs parallel to the wavelength from the input has a horizontal length of 10 µm where the coupling of the evanescent field is observed. Both ends of the additional slot waveguide can be tailored to the output antenna 28B, after a 90° bend and vertical waveguides. The power in one of the waveguides can evanescently couple to the other waveguide back and forth. For example, the thickness of the thin metallic film that separates the two parallel running waveguides can be in the range of 50-100 nm. Depending on the coupling length and the operation wavelength (which affect the coupling coefficient of the two waveguides), the optical power can switch between the different waveguide outputs or distribute equally on the two waveguides. Light is coupled through the core and can be emitted through output port O1 or output port O2, depending on the operational wavelength. The incident polarization state of the incoming radiation is along with the input antenna orientation which helps coupling of SPP mode in the slot waveguide effectively as discussed before.

Simulations show that an emission ratio from waveguide 30A to waveguide 30B of 550% could be achieved in at least one embodiment. Results show that light can couple to the plasmonic directional coupler and be emitted equally from the output ports O1 and O2 at a wavelength of 1550 nm, shown in FIG. 7D. At the wavelength of 1630 nm, more light is emitted through output port O2, shown in FIG. 7E, indicating the initial directional coupling properties and resultant switching properties. Additional optimization can occur by variation in separation and coupling length.

Figure 7F:
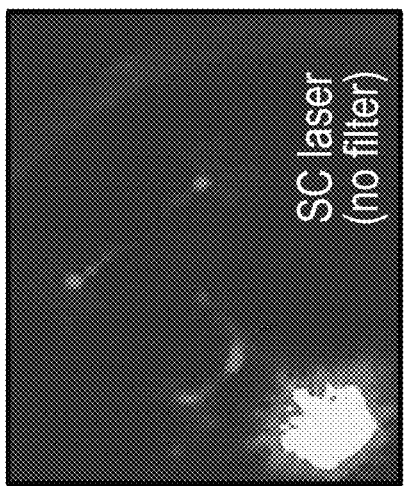
FIG. 7F is an SEM image of a panda-shaped (PS) optical fiber facet with another exemplary integrated directional coupler nanocircuit.
Figure 7G:
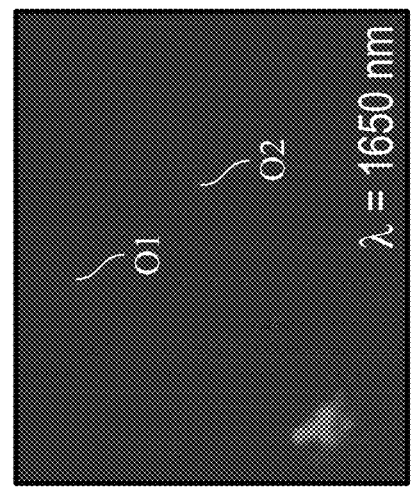
FIG. 7G is an overlapped image of far-field measurement at wavelength of 1630 nm of the exemplary plasmonic directional coupler of FIG. 7F.
Figure 7H:
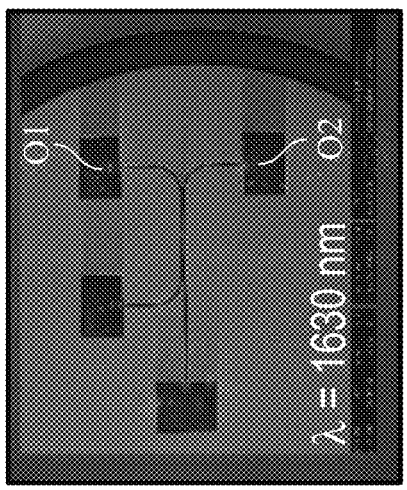
FIG. 7H is far-field image of the plasmonic directional coupler of FIG. 7F using a supercontinuum (SC) source laser without an optical filter.
Figure 7I:
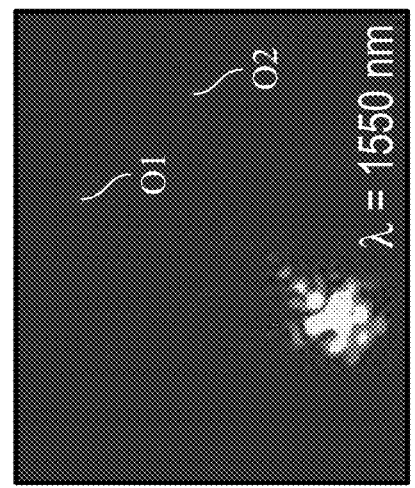
FIG. 7I is a measured far-field optical image at wavelength of 1480 nm detected at cross-polarization to the incident radiation.
Figure 7J:
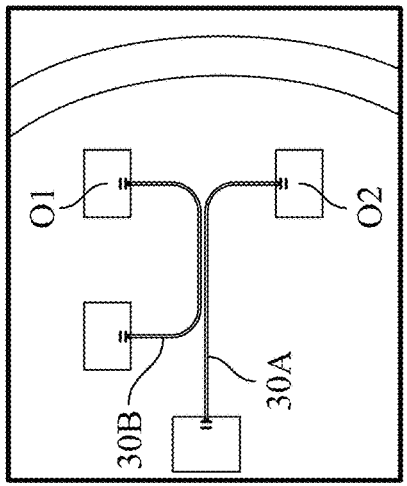
FIG. 7J is a measured far-field optical image at wavelength of 1550 nm detected at cross-polarization to the incident radiation.
Figure 7K:
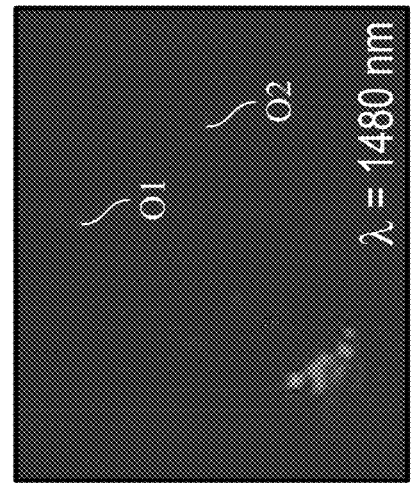
FIG. 7K is a measured far-field optical image at wavelength of 1650 nm detected at cross-polarization to the incident radiation.

FIG. 7F is an SEM image of a panda-shaped (PS) optical fiber facet with another exemplary integrated directional coupler nanocircuit. FIG. 7G is an overlapped image of far-field measurement at wavelength of 1630 nm of the exemplary plasmonic directional coupler of FIG. 7F. FIG. 7H is far-field image of the plasmonic directional coupler of FIG. 7F using a supercontinuum (SC) source laser without an optical filter. FIG. 7I is a measured far-field optical image at wavelength of 1480 nm detected at cross-polarization to the incident radiation. FIG. 7J is a measured far-field optical image at wavelength of 1550 nm detected at cross-polarization to the incident radiation. FIG. 7K is a measured far-field optical image at wavelength of 1650 nm detected at cross-polarization to the incident radiation. A CW supercontinuum (SC) laser in conjunction with bandpass filters are utilized in the far-field measurement of the nanocircuit. FIG. 7G illustrated the overlapped far-field optical measurement image with the SEM image, clearly showing the coupling of the output. FIG. 7H shows the distinct coupling at the output antenna with the SC source when no filter was used with light conducting to all antenna on the waveguides. FIG. 7I shows the far-field measurement when a bandpass filter at wavelength of 1480 nm with a bandwidth of ±10 nm. The measurement shows the higher intensity of output port O1 (O1=cross output, intensity Icross) compared to output port O2 (O2=bar output, intensity Ibar). FIG. 7J shows the almost equal intensity of both output ports O1 and O2 at 1550 nm. FIG. 7K shows the higher intensity of output port 2 at 1650 nm. Thus, FIG. 7J shows the power coupling in between FIG. 7I and FIG. 7K.

Figure 8A:
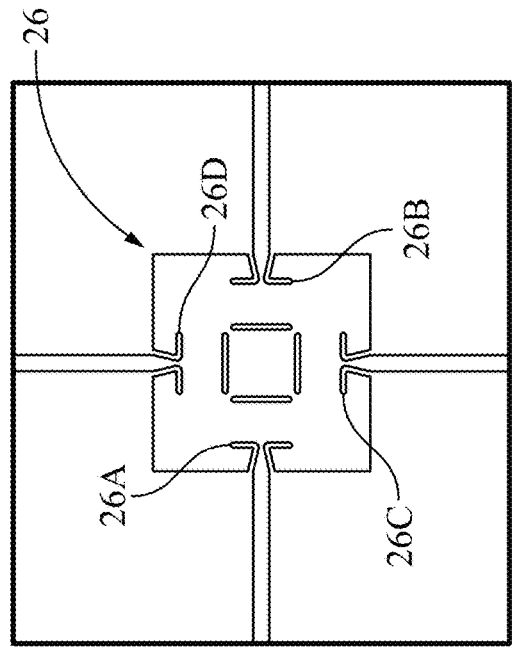
FIG. 8A is a SEM image of an exemplary polarization splitter nanocircuit.
Figure 8B:
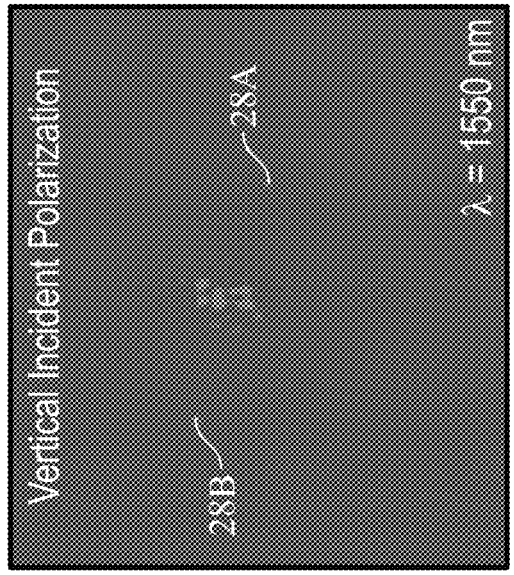
FIG. 8B is an enlarged SEM image of the input antennas of the polarization splitter of FIG. 8A.
Figure 8C:
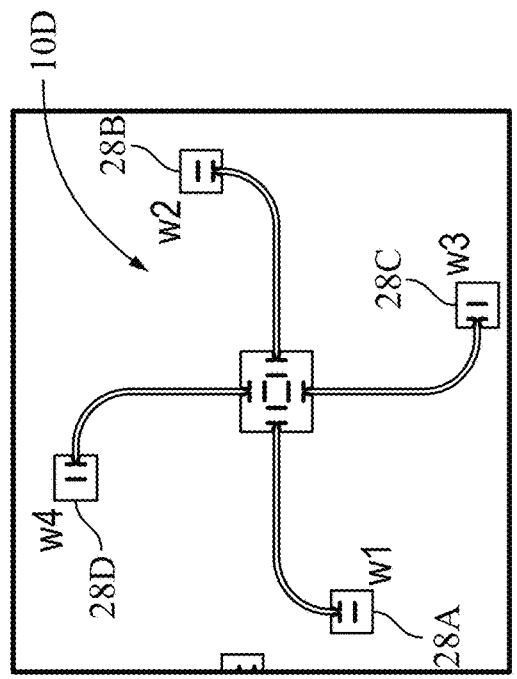
FIG. 8C is a measured far-field optical mirror image of the polarization splitter of FIG. 8A, showing horizontal incident polarization light transmitted through waveguides with horizontally aligned input antennas.
Figure 8D:
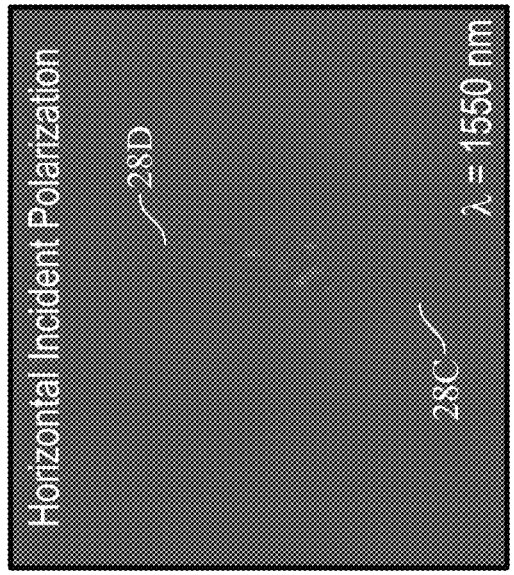
FIG. 8D is a measured far-field optical mirror image of the polarization splitter of FIG. 8A, showing vertical incident polarization light transmitted through waveguides with vertically aligned input antennas.
Figure 8E:
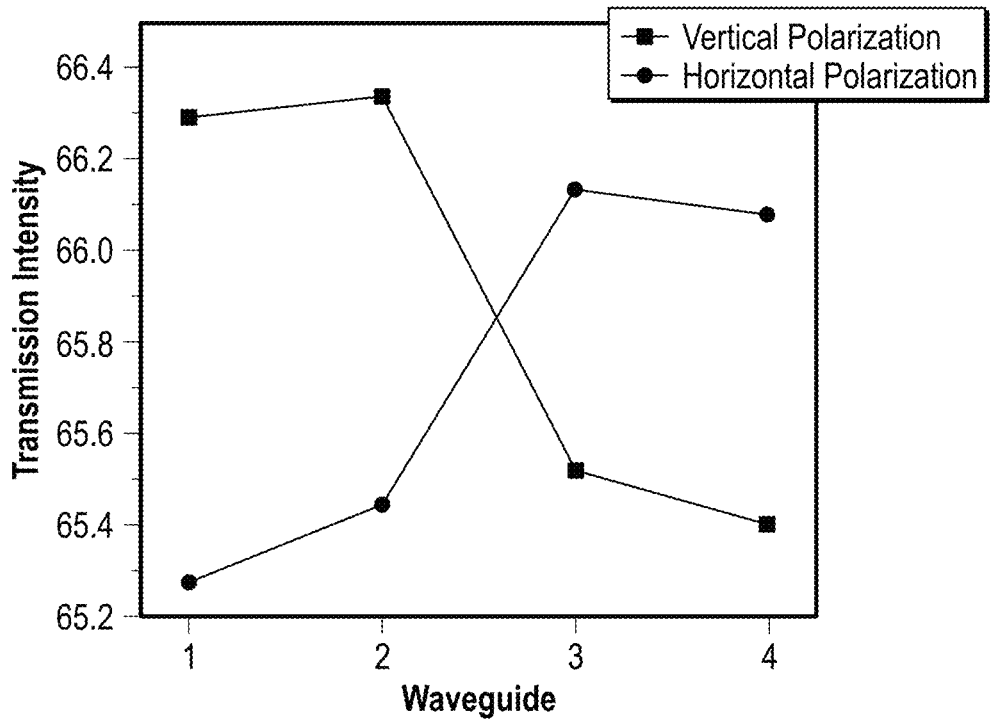
FIG. 8E is a chart illustrating transmission intensities for each of the waveguides illustrated in the polarization splitter of FIG. 8A according to their respective horizontal or vertical alignments with horizontal and vertical polarization input.
Figure 8F:
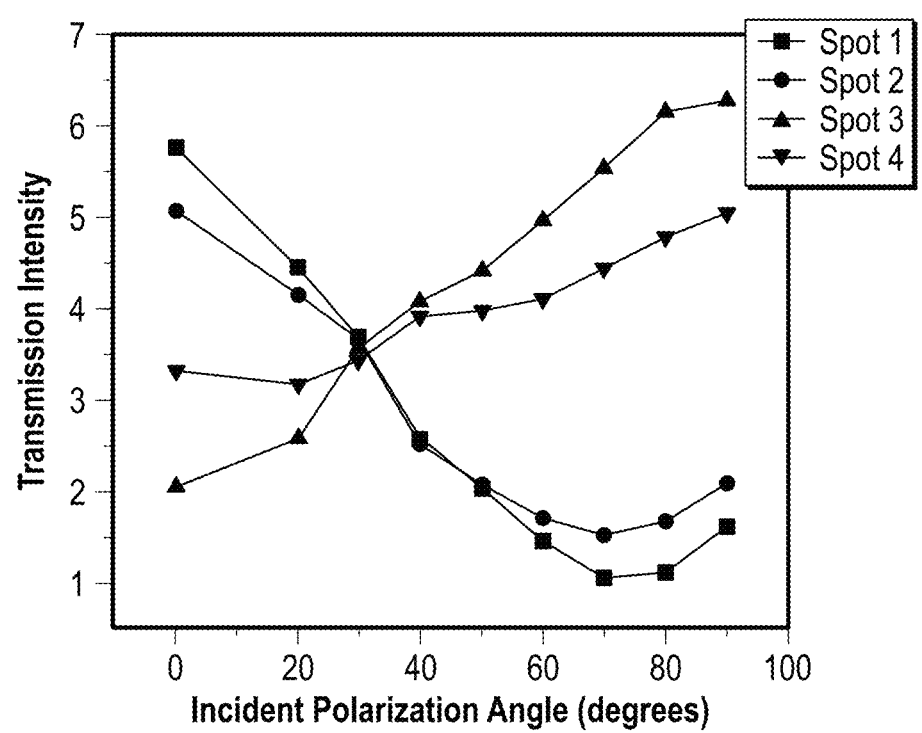
FIG. 8F is a chart illustrating transmission intensities for each of the waveguides illustrated in the polarization splitter of FIG. 8A according to their respective horizontal or vertical alignments with a rotated polarization input not in the horizontal or vertical planes.

Embodiments shown in the remaining figures represent prophetic embodiments. FIGS. 8A-8F illustrate another nanocircuit in the form of a polarization splitter nanocircuit. FIG. 8A is a SEM image of an exemplary polarization splitter. FIG. 8B is an enlarged SEM image of the input antennas of the polarization splitter of FIG. 8A. FIG. 8C is a measured far-field optical mirror image of the polarization splitter of FIG. 8A, showing horizontal incident polarization light transmitted through waveguides with horizontally aligned input antennas. FIG. 8D is a measured far-field optical mirror image of the polarization splitter of FIG. 8A, showing vertical incident polarization light transmitted through waveguides with vertically aligned input antennas. FIG. 8E is a chart illustrating transmission intensities for each of the waveguides illustrated in the polarization splitter of FIG. 8A according to their respective horizontal or vertical alignments with horizontal and vertical polarization input. FIG. 8F is a chart illustrating transmission intensities for each of the waveguides illustrated in the polarization splitter of FIG. 8A according to their respective horizontal or vertical alignments with a rotated polarization input not in the horizontal or vertical planes.

A polarization splitter 10D allows an ability to switch the output signal of the nanocircuit on fiber with the polarization state of the core mode. The embodiment of FIG. 8A and enlarged in FIG. 8B have input antennas 26A-26D (generally, 26) can be axially aligned with a fiber core. Input antennas 26 are aligned in the SEM image horizontally and vertically, that is generally at right angles. One set of input antennas 26A and 26B on the left and right of the image in FIG. 8B is aligned vertically with corresponding antennas 28A and 28B providing outputs after the bend in the waveguides W1 and W2. The other set of input antennas 26C and 26D at the top and bottom of the image in FIG. 8B is aligned horizontally with corresponding antennas 28C and 28D providing outputs after the bend in the waveguides W3 and W4. In the optical measurement, an extra optical component, a half-wave plate, can be added just after a linear polarizer at the input end. The half-wave plate can be rotated in any direction to change the polarization state of the incident light that goes into the fiber. The use of this half-wave plate changes the polarization by $2e$ when rotated with angle θ while offering almost zero effect on coupling/alignment in the optical path. For example, as shown in FIG.

8C the horizontal polarization state of the incident signal in the fiber excites the input antennas 26C and 26D that are aligned to the respective polarization and hence waveguide W3 and waveguide W4 are lighted up, so that transmission is observed. Similarly, if the polarization is switched to a vertical polarization state, the incident signal in the fiber excites the input antennas 26A and 26B that are aligned to the respective polarization and hence waveguide W1 and waveguide W2 are lighted up, so that transmission is observed. If the light were incident at any other angles, then the transmission would be obtained as per their resolute component in each direction. Ideally, each of the four-output antennas should be observed to be equally emitting the signal when the incident polarization state is at 45° to the horizontal. The example shown in FIG. 8F experimentally focuses at a different angle due to test data and fabrication of this example, and so is mainly useful to illustrate the concept rather than an exact degree.

Figure 9C:
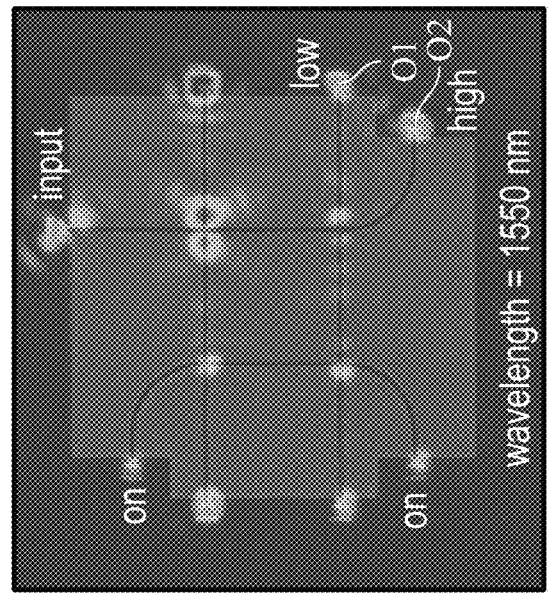
FIG. 9C illustrates a measured optical image of the RGWN of FIG. 8B with an output at a wavelength of 1550 nm.
Figure 9A:
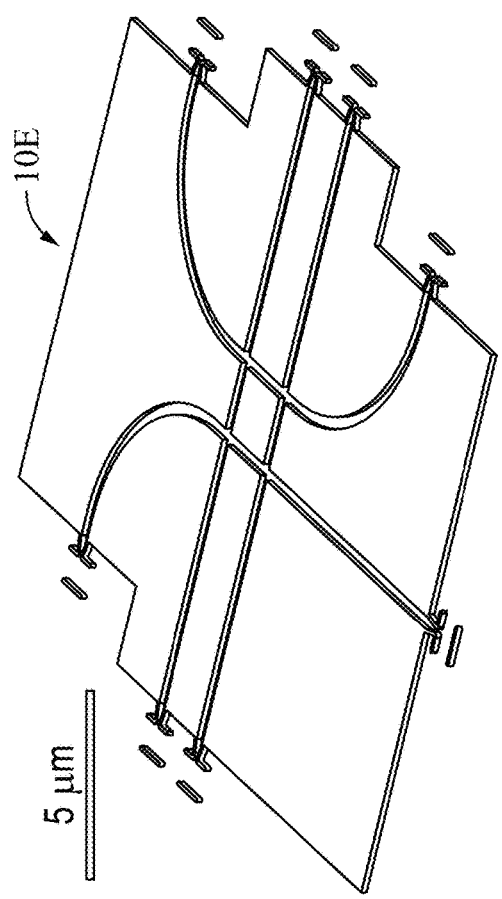
FIG. 9A illustrates an SEM image of an exemplary resonant guided wave network (RGWN) nanocircuit fabricated on planar substrate.
Figure 9B:
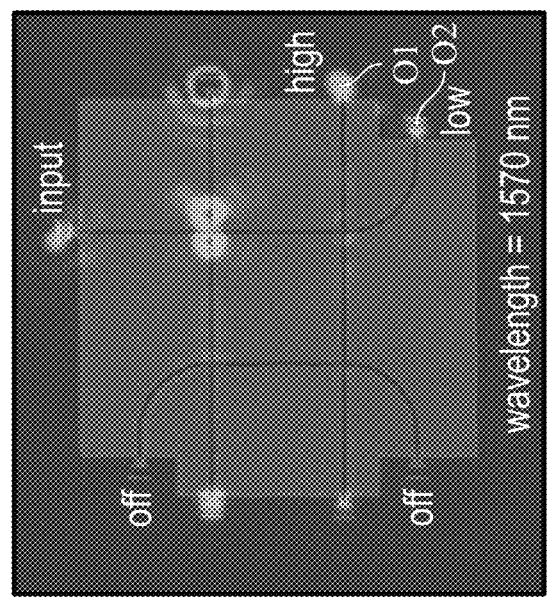
FIG. 9B illustrates a measured optical image of an RGWN with a resonant size of 7.5 µm, showing an output at a wavelength of 1570 nm.
Figure 9D:
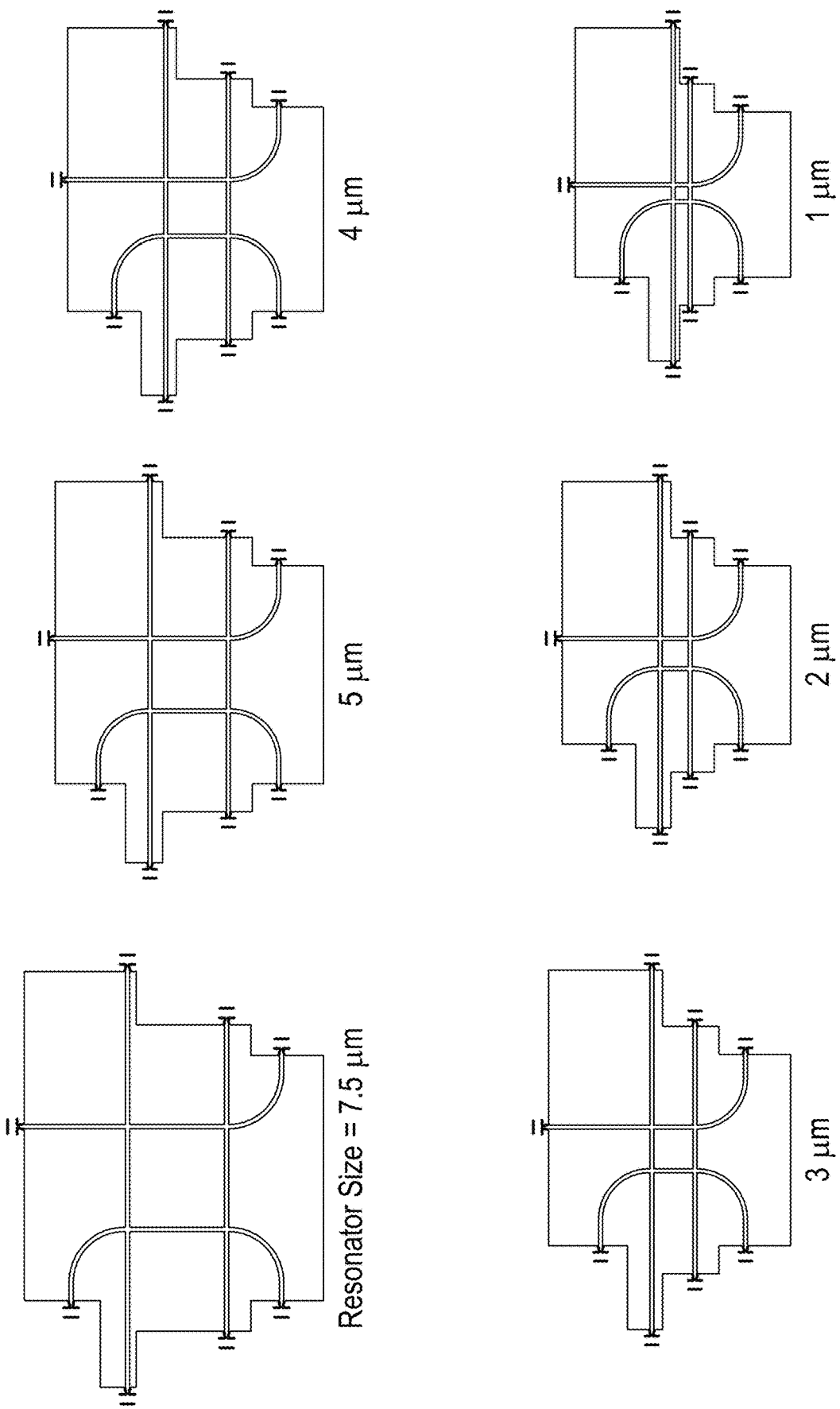
FIG. 9D illustrates SEM images of fabricated RGWNs with different sizes.

FIGS. 9A-9D illustrates is a set of diagrams as examples of compact resonant guided wave networks (RGWN) nanocircuit 10E for an optical fiber tip. FIG. 9A illustrates an SEM image of an exemplary RGWN nanocircuit fabricated on planar substrate. FIG. 9B illustrates a measured optical image of an RGWN structure with a resonant size of 7.5 µm, showing an output port O1 high and output port O2 low at a wavelength of 1570 nm. FIG. 9C illustrates a measured optical image of the RGWN structure of FIG. 9B with an output port O1 low and an output port O2 low at a wavelength of 1550 nm. A comparison between FIG. 9B and FIG. 9C illustrates switching properties of the RGWN at different wavelengths. FIG. 9D illustrates SEM images of fabricated RGWNs with different sizes to demonstrate possibilities on the optical fiber facet in nanocircuits.

Figure 10A:
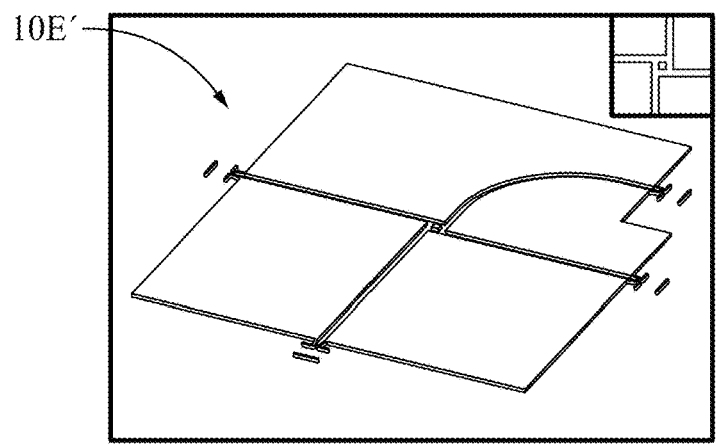
FIG. 10A is an SEM image on an exemplary embodiment of an ultracompact RGWN nanocircuit with a resonator size of 300 nm.
Figure 10B:
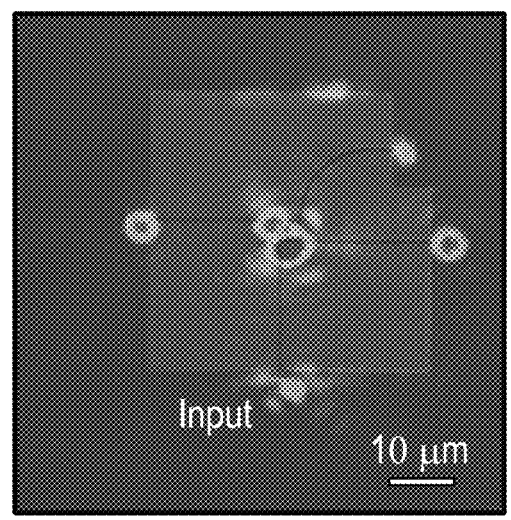
FIG. 10B is a measured optical image of the RGWN of FIG. 10A.
Figure 10C:
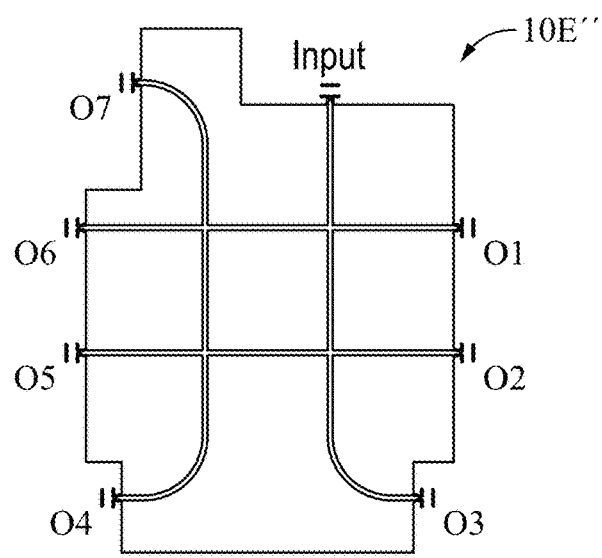
FIG. 10C is an SEM image of another exemplary embodiment of an RGWN with a resonator size of 7.5 µm.
Figure 10D:
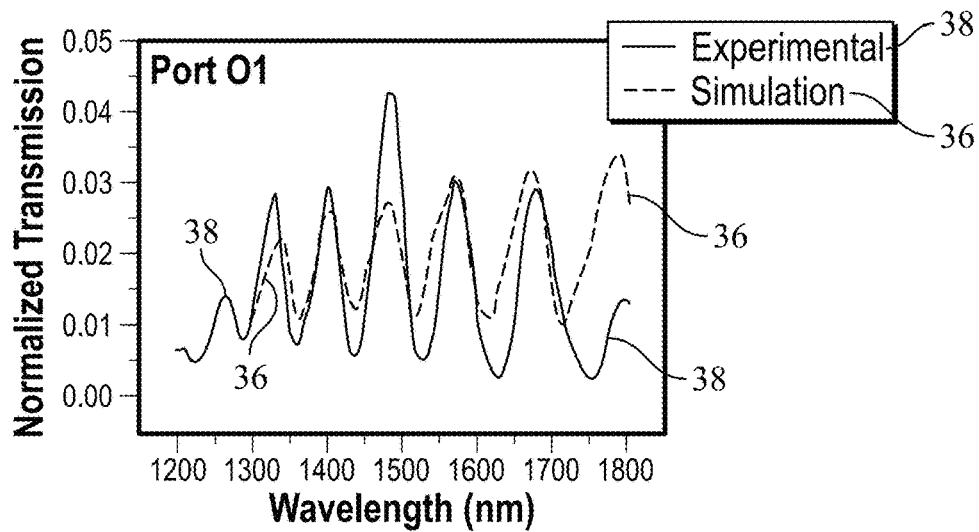
FIG. 10D is a chart illustrating exemplary measured and simulated spectra for port 1 of the RGWN of FIG. 10C.
Figure 10E:
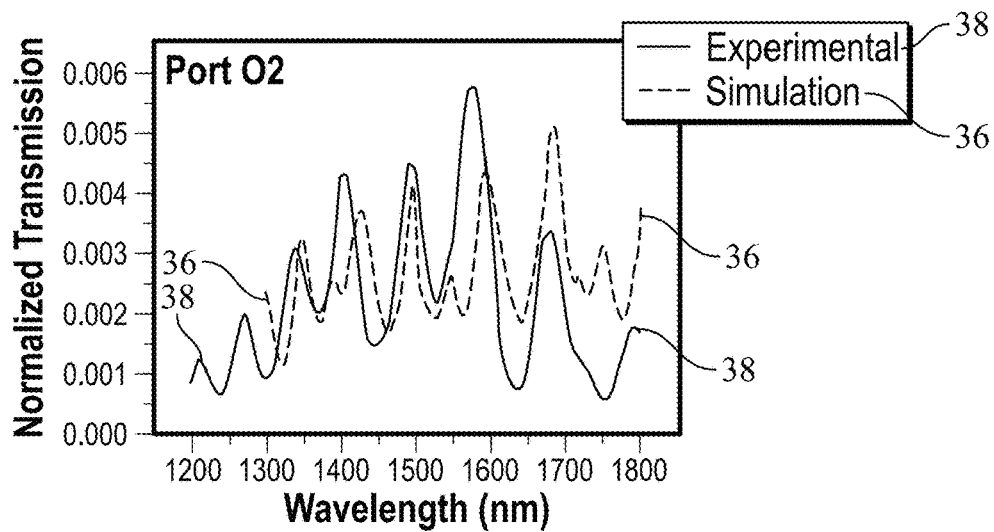
FIG. 10E is a chart illustrating exemplary measured and simulated spectra for port 2 of the RGWN of FIG. 10C.
Figure 10F:
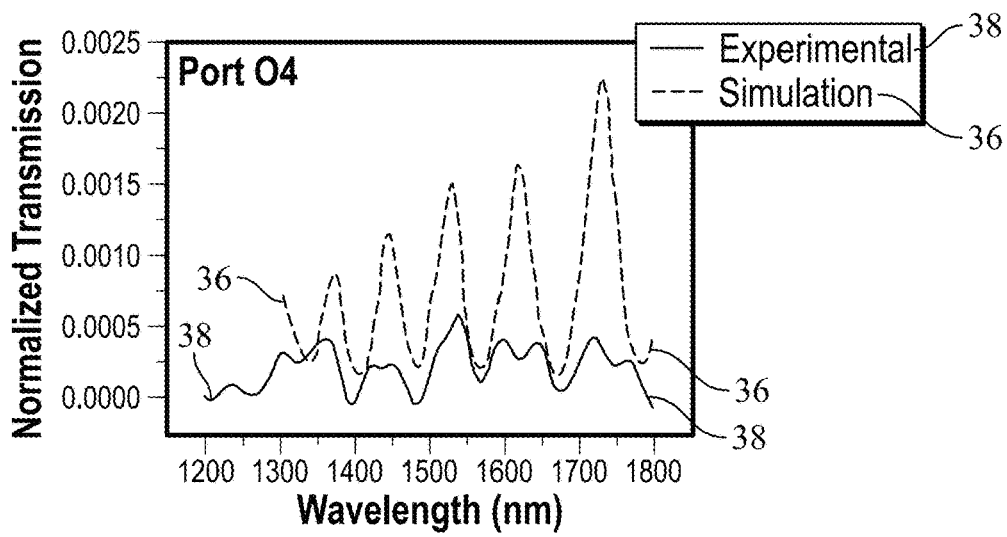
FIG. 10F is a chart illustrating exemplary measured and simulated spectra for port 4 of the RGWN of FIG. 10C.

FIGS. 10A-10F illustrate a schematic of ultracompact RGWN nanocircuits and various graphs showing results. FIG. 10A is an SEM image on an exemplary embodiment of an ultracompact RGWN nanocircuit 10E' with a resonator size of 300 nm. FIG. 10B is a measured optical image of the RGWN of FIG. 10A. FIG. 10B shows efficient coupling to three output ports. FIG. 10C is an SEM image of another exemplary embodiment of an RGWN 10E'' with a resonator size of 7.5 µm. FIG. 10D is a chart illustrating exemplary measured and simulated spectra for port O1 of the RGWN of FIG. 10C. FIG. 10E is a chart illustrating exemplary measured and simulated spectra for port O2 of the RGWN of FIG. 10C. FIG. 10F is a chart illustrating exemplary measured and simulated spectra for port O4 of the RGWN of FIG. 10C.

In at least one embodiment, plasmonic RGWN nanocircuits 10E (shown in FIG. 9A), 10E' 10E'' (generally, 10E) can be used on optical fiber, in which multiple resonances are formed inside the network due to coherent interference of plasmon waves. To integrate an RGWN on an optical fiber, the Yagi-Udo-style antenna, for example, can couple the optical core mode with light to the RGWN. A high numerical aperture ("NA") objective lens can be used to focus the laser into a ~1 µm spot to excite an input antenna. Measured far-field images of a RGWN for wavelength of 1570 nm and 1550 nm are displayed in FIG. 10B. The Figure shows that the output signals are highly wavelength dependent. "Off/on" or "high/low" output states can be altered by different wavelengths, thus showing a wavelength selective device and wavelength demultiplexing properties due to the resonant interference. The RGWN can be used to develop an ultracompact circuit with wavelength-selective functionality. It is believed that the RGWN with a resonant size from about 7.5 µm to about 300 nm could be routinely fabricated with good transmission, as shown in FIG. 10C and FIG. 10A. The plasmonic RGWN is believed to be able to reach at least a sub-hundred-nanometer scale size while maintaining the coherent wave interference. The emission spectra of an RGWN with a resonant size of 7.5 µm in FIG. 10C were measured and the results for ports O1, O2, and O4 are shown in FIGS. 10D-10F. The beating in the measured spectra showing the resonant nature due to multiple propagating wave interference. The numerical simulation results in line 36 show fair agreement on the spectral response and amplitude of the experimental results in line 38, indicating the capability of using RGWN to develop a nanoscale resonant device.

With difference sizes and grids of the network, the invention can provide a resonant guided wave network that can be used for permutations of Boolean on/off values and distribution of optical signal in the nanoscale. The plasmonic RGWN can be used for on-fiber compact optical logic or wavelength multiplexing/demultiplexing devices at telecommunication wavelengths, routing different wavelengths with different on/off combinations to different transmission ports for the development of fiber-coupled nanocircuits.

The invention can further improve plasmonic structures by combining the strong electrical tunability and ENZ nonlinearity of field-effect conducting oxide materials, and the concept of resonant guided wave networks and directional coupler. The result is an electrically gate-controllable and ultrafast nonlinear optically tunable plasmonic network that can serve as an ultrafast (>100 GHz) switching, coupling, and multi-channel logic component with more than a hundred on/off Boolean states.

FIGS. 11A-11D illustrate an example of a tunable RGWN nanocircuit 10E''' that can be reconfigured for active signal processing and associated schematics and optical images. FIG. 11A is a schematic of an example of a tunable RGWN nanocircuit. FIG. 11B is a schematic of a corresponding transparent conducting oxide (TCO) waveguide. FIG. 11C illustrates a simulated response with an applied bias. FIG. 11D illustrates a simulated response without an applied bias, showing the ultrafast switching capability. At least one embodiment includes selective integration of ENZ materials into subwavelength dimension antenna-coupled plasmonic slot waveguide networks 10E''' shown in FIGS. 11A and 11B. To actively control the resonant behavior of the in-fiber plasmonic RGWN, the invention can use the field-effect tuning of an ENZ material, such as a conducting oxide or nitride, in a MOS-type structure, shown in FIG. 11B. The exemplary MOS device includes a metal layer 16 that can be used to form the nanocircuit portions, dielectric insulator layer 42 over the metal layer 16, and a TCO layer. For purposes herein, a "TCO" material includes ITO, AZO, or TiN, and similar materials with transparency and electronic conductivity properties). The dielectric insulator generally has a high dielectric value, for example aluminium oxide ($Al_2O_3$), hafnium dioxide ($HfO_2$), aluminium-doped zinc oxide (AZO), or other materials having suitable dieletric insulation properties. As described in FIG. 3A, the metal layer 16 can be deposited on the facet 8 of the optical fiber 4 and milled to form the slot 20, nanocouplers (such as antennas) and other structures for the nanocircuit. A dielectric insulator layer 42 can be deposited on the metal layer 16, for example, by atomic layer deposition (ALD) or sputtering after the focused ion beam (FIB) milling/electron beam lithography processes on the metal layer. The TCO layer 44 can be deposited on the dielectric layer 42. The metal, dielectric insulator, and TCO layers can be coupled by a wire bonding technique or physical contact with a specially designed fiber holder. This coupling will allow an efficient control of the optical confinement based on the accumulated electron distribution and tunable permittivity for controllable phase and amplitude and thus control of the resonant properties of the network. Particularly, when the signal wavelength approaches the ENZ resonance in the voltage-tuned conducting oxide accumulation layer, a large effective index of propagating mode can be achieved, thus leading strong modulation of the resonant signals.

Numerical simulation results on the electrical modulation are shown in FIGS. 11C and 11D. The signal of the two output ports as the top of the images with "on/off" states can be alternated by applying gate voltage of, for example, 3V. The TCO ENZ field-effect tunability affects switching properties of the plasmonic directional coupler. It is possible that by reducing the size of the TCO field-effect structures (such as 2-3 µm) with low gate capacitance in the RGWN or directional coupler, the operation speed of modulation could exceed tens of GHz to few hundred GHz with considerable low energy consumption (<1 fJ/bit).

The abnormally large ENZ nonlinearity of TCO materials can be used to dynamically control the complex optical wave and functions of the plasmonic nanocircuits. The abnormally large ENZ nonlinearity of TCO materials includes abnormally high nonlinear refraction coefficients (n2) and the nonlinear absorption coefficients (β2) of AZO ENZ thin films near the ENZ wavelength. The measured coefficients n2(eff)~10-8 mm$^2$/W and β2(eff)~-10$^{-4}$ cm/W were obtained by Z-scan nonlinear measurement techniques using an ultrafast femtosecond laser at wavelength of 1550 nm. The measured nonlinearity of the ENZ thin film can be strong (as in 2-3 orders of magnitude higher than highly nonlinear chalcogenide glasses) and could be further tuned via ALD parameters during deposition of the AZO materials.

FIGS. 12A-12D illustrates an example of a nanocircuit as a tunable directional coupler and associated schematics. FIG. 12A is a schematic of an exemplary tunable ENZ/plasmonic directional coupler nanocircuit 100 for nonlinear optical switching. FIG. 12B is a schematic of an exemplary corresponding ENZ waveguide of the directional coupler of FIG. 12A. FIG. 12C shows a simulated field profile of the ENZ/plasmonic directional coupler with low excitation power. FIG. 12D shows a simulated field profile of the ENZ/plasmonic directional coupler with high excitation power. The ENZ nonlinearity can be combined with the plasmonic nanostructures for ultrafast optical control of the optical fiber nanocircuits. The ultrafast optically tunable properties of a plasmonic slot waveguide such as in FIG. 6A, and plasmonic directional coupler, such as in FIG. 7C, can be demonstrated by depositing a TCO layer 44 over the metal layer 16, shown in FIG. 12B. For example, a 20-30 nm thick TCO layer 44 that exhibits ENZ wavelength at the femtosecond laser operational wavelength (such as 1550 nm) can be deposited over the metal layer 16 of the slot plasmonic waveguide by ALD/sputtering techniques. The silicon oxide layer 24 described in FIG. 3A can be deposited over the TCO layer 44. Due to the strong optical confinement of the plasmonic waveguide and the high optical nonlinearity of the ENZ, the phase and amplitude of the propagating plasmonic wave can be altered by ultrafast femtosecond pulse. Simulation on the change of the light propagation of the AZO ENZ plasmonic slot waveguide using the nonlinearity measured by the Z-scan technique is shown. A large nonlinearly optical-induced refractive index change can be obtained near the ENZ wavelength with mode's effective index increase from 1.515+0.308i (low power) to 1.569+0.136i (high power) at the ENZ wavelength. The change can lower the propagation loss of the mode from 10.33 dB/µm (low power) to 4.57 dB/µm (high power) and results in a change of field confinement, shown in FIGS. 12C and 12D. The enhanced ENZ nonlinear effects can be used with the plasmonic coupler such as shown in FIG. 7A, and RGWN, such as shown in FIG. 9. The highly dispersive optical directional couplers offer a platform where nonlinear response of the ENZ materials will induce a great influence on the power dependency of the system. A strong nonlinear switching effect can occur where the output emission from two output ports will be strongly dependent on the incident laser power.

The combined electrical and optical coherent control of the spatial and temporal evolution of the propagating plasmon modes in an RGWN can be studied by launching fs-laser pulses to excite the multiple Eigen modes of the coupler while electrical gating is provided for extra control of the dispersion of the eigenstates. In general, the invention can integrate active conducting oxide materials and plasmonic structures, allowing efficient active optical components for novel nanodevice applications and next-generation ultra-compact and high-speed integrated nanocircuits with ultralow power consumption.

With the efficient coupling and functions of the optical fiber nanocircuits, various higher-level applications can be based on the ultra-dense plasmonic nanocircuits. Non-limiting examples, for instance, can include signal processing with optical fiber input and output, enhancement of quantum emission for in-fiber quantum source, and ultrasensitive optical/molecular sensing.

FIGS. 13A-13G show schematic diagrams of exemplary structures of optical fiber ENZ nanocircuits for integrated photonic communication. To demonstrate the concepts for the optical fiber tip nanocircuits to be used as an ultracompact integrated circuit for nanoscale signal processing and manipulation, the following three embodiments can be shown.

Figure 13C:
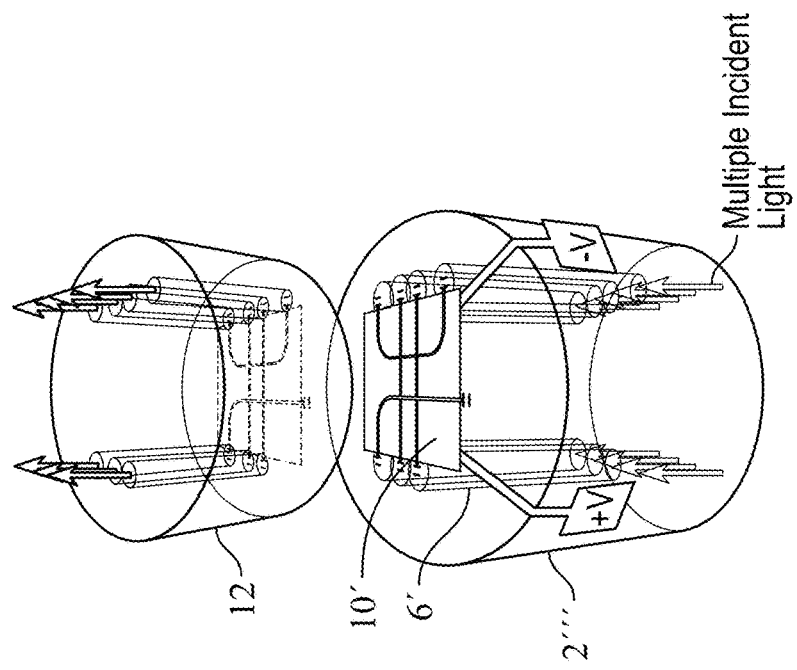
FIG. 13A is a schematic illustrating an exemplary embodiment of a tunable optical fiber ENZ nanocircuit having an optical fiber with a single mode core, a nanocircuit on the optical fiber tip, and a multicore optical fiber.
FIG. 13B is a schematic illustrating another exemplary embodiment of a tunable optical fiber ENZ nanocircuit with a single mode core.
FIG. 13D is a schematic of an exemplary multicore optical fiber.
FIG. 13E is a schematic enlarged view of the multicore optical fiber of FIG. 13D.
FIG. 13F is a schematic illustrating an exemplary nanocircuit that can be closely coupled with the multicore optical fiber of FIG. 13D.
FIG. 13G is a schematic enlarged partial view of the nanocircuit of FIG. 13F.
Figure 13B:
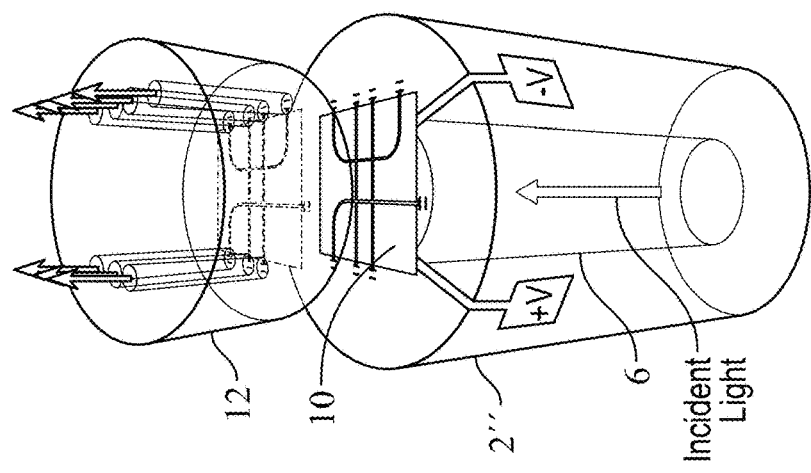
Figure 13A:
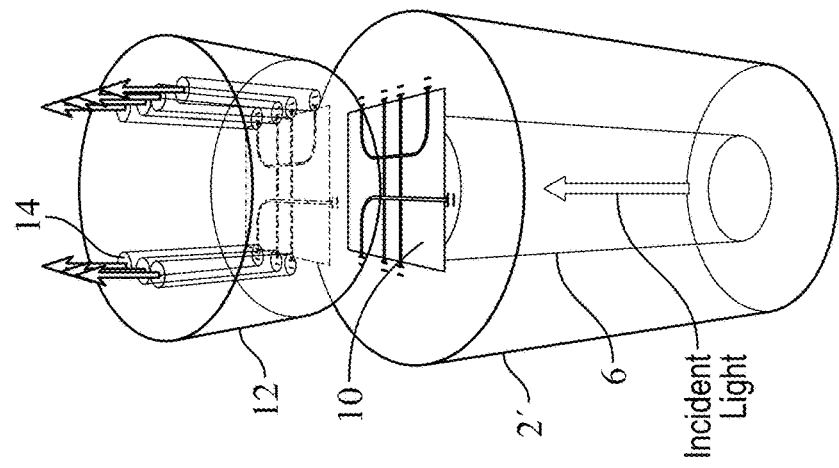
Figure 13D:
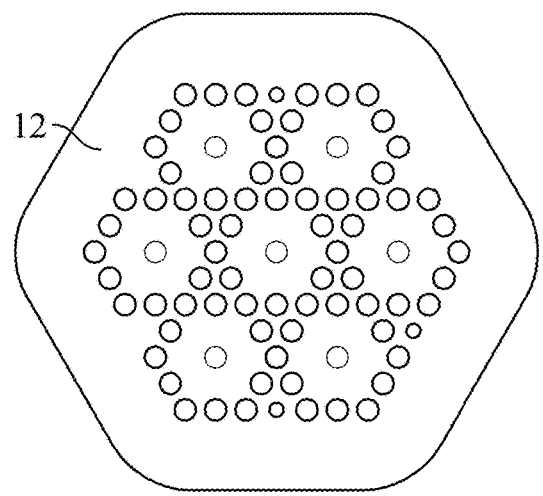
Figure 13E:
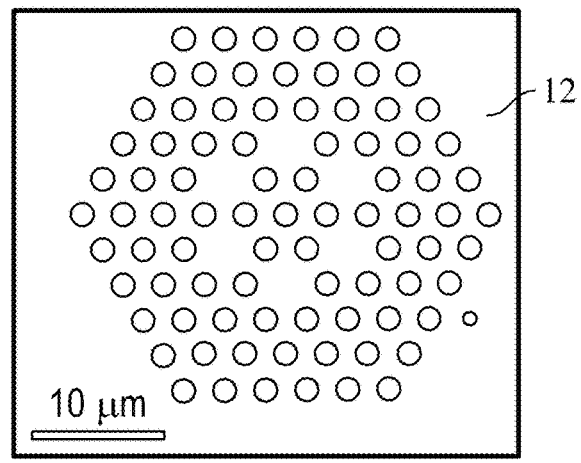
Figure 13F:
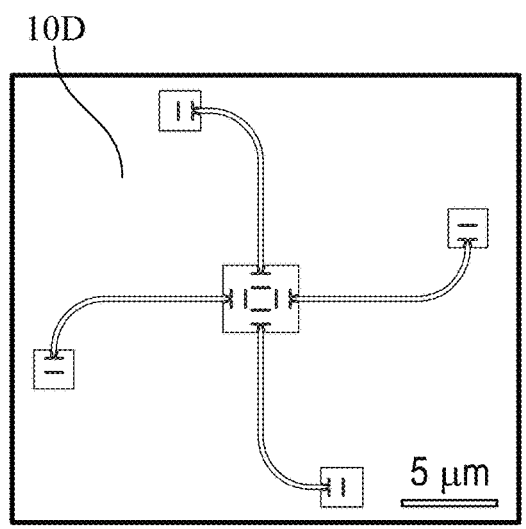
Figure 13G:
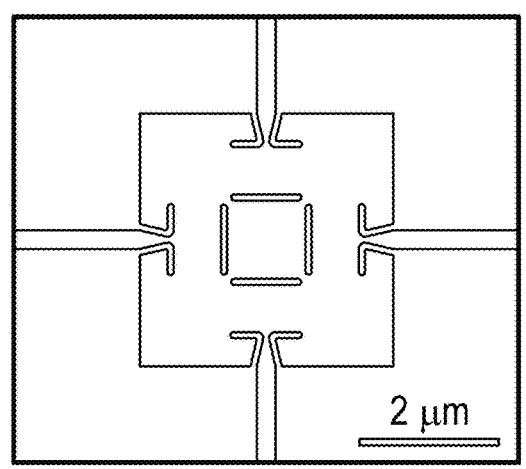

FIG. 13A is a schematic illustrating an exemplary embodiment of a tunable optical fiber ENZ nanocircuit device 2' having an optical fiber with a single mode core 6, a nanocircuit 10 on the optical fiber tip, and an output multicore optical fiber 12 with output ports 14. The embodiment has electronic or nonlinear optical dynamic control with the tunable nanocircuit 10 on the optical fiber tip where input is from a single mode core 6 for input to the tunable nanocircuit. The multicore optical fiber 12, such as shown in FIGS. 13D and 13E, is closely coupled with the nanocircuit 10 to receive input from the nanocircuit for multiple outputs 14 from the multicore optical fiber. As shown in the structure in FIG. 13F with the enlarged view of FIG. 13G, depending on the vertical/horizontal polarization of the incident, certain output ports of the structures can be selectively excited, thereby providing another way to manipulate the coherent signals and output selection.

FIG. 13B is a schematic illustrating another exemplary embodiment of a tunable optical fiber ENZ nanocircuit device 2" with a single mode core 6. The embodiment has electronic or nonlinear optical dynamic control with the tunable nanocircuit 10 on the optical fiber tip where input is from a single mode core 6 for input to the tunable nanocircuit. A multicore optical fiber 10 is closely coupled with the nanocircuit to receive input from the nanocircuit for multiple outputs 14 with more or more different properties from the multicore optical fiber 12. It is envisioned that such an embodiment can be useful for optical switching, wavelength demultiplexing, resonant interferences, or routing/Boolean logic, and other applications.

FIG. 13C is a schematic illustrating an exemplary tunable optical fiber ENZ nanocircuit device 2''' with a multicore fiber 6' to provide a plurality of inputs to the nanocircuit. Multi-input light through the mulicore fiber 6' can be coupled to the nanocircuit 10' (such as a RGWN or directional coupler) and coherently interfere via the linear or nonlinear interaction, leading to advanced control of the propagating light dispersion and phase/amplitude modulation. The nanocircuit can be configured to receive the multiple incident lights from the core 6'. A time-resolved pump probe setup can probe the nonlinear dynamic through the multicore fiber. For the electrical control of the fiber nanocircuits, high-speed electronics and detectors can be used to monitor the output signals up to tens of GHz operation speed. The embodiment has electronic or nonlinear optical dynamic control with the tunable nanocircuit on the optical fiber tip where input is from the multicore fiber. An output multicore optical fiber 12 is closely coupled with the nanocircuit to receive input from the nanocircuit for multiple outputs of a different nature. The light is emitted from multiple output ports of the nanocircuits and couples directly to the output multicore optical fiber 12 for light collection, for instance, with spectrometers or detectors. To enable such nanocircuit functions, the ENZ materials can be used for the electrical and nonlinear optical tunability. The output signals of the multiple output ports can be controlled either by applying bias or by launching ultrafast femtosecond pulses, as referenced herein. A similar detection scheme can be used to collect light through output multicore optical fibers, illustrated in FIGS. 13A and 13B. A device 2 with polarization-dependent coupling can also be used as a means of controlling the nanocircuits.

Light emission and nonlinear optical processes of molecules/materials are known to be strongly dependent on the electromagnetic field intensity and they can be tremendously strengthened by plasmonic structures due to the high confinement of the plasmonic mode. Recent studies show that Raman emission of molecule could be enhanced by using on-chip plasmonic slot waveguides. The enhanced emission is due to the electric field and Purcell factor enhancements and the increase of light-matter interaction volume and the Raman signal collection efficiency. In addition, recently, several studies of plasmonic Purcell effects and coupling between quantum emitters and ENZ materials have been reported. To boost the emission enhancement ability of ENZ/plasmonic materials, the invention goes beyond present understandings and further utilizes the field confinement of the ENZ nanolayer and the long-interaction length of the plasmonic slot waveguide on the optical fiber tip nanocircuits.

Figure 14B:
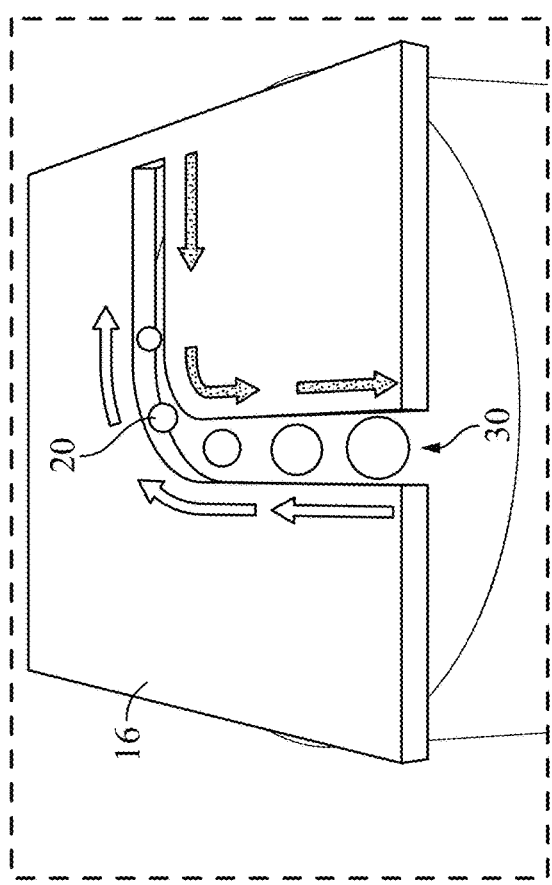
FIG. 14B is an enlarged view of the nanostructure of FIG. 14A.
Figure 14C:
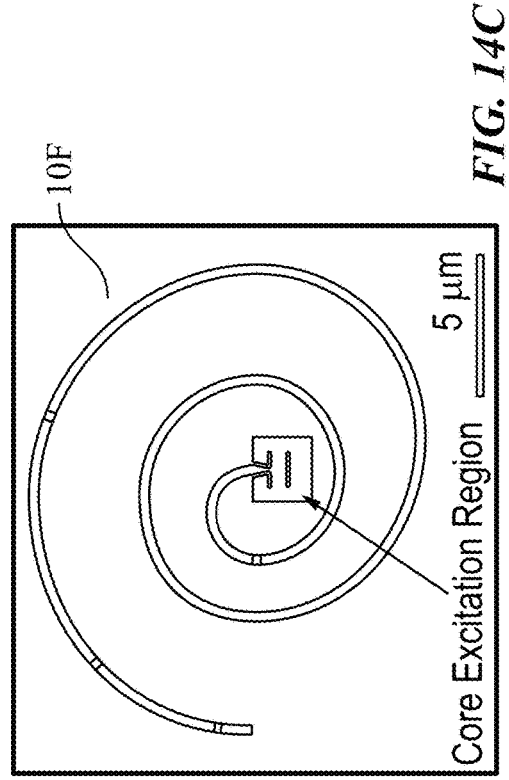
FIG. 14C illustrates an example of a fabricated structure on optical fiber with a long interaction length.
Figure 14A:
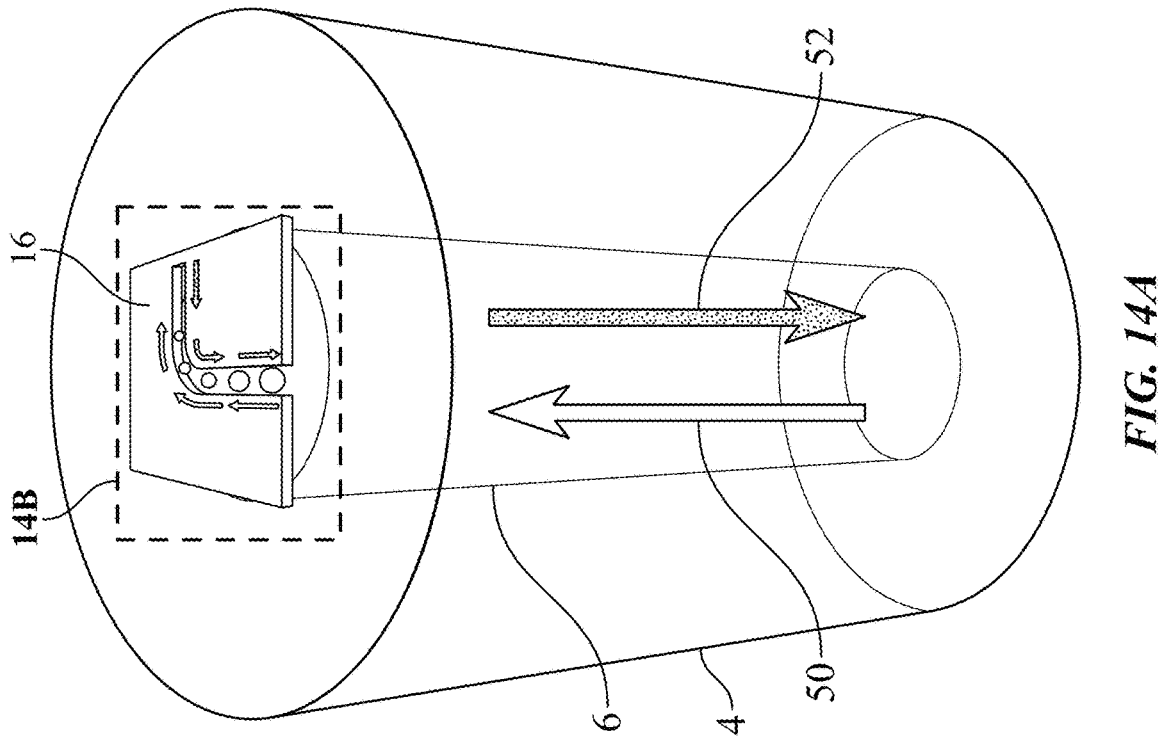
FIG. 14A illustrates schematics of the optical fiber plasmonic waveguide sensor.

FIGS. 14A-14C illustrate an example of an optical fiber plasmonic waveguide sensor nanocircuit 10F for enhanced Raman and optical sensing. Such a nanocircuit can assist with integration of the plasmonic waveguides herein by better interaction with molecules and can receive input from one or more of the above nanocircuits. FIG. 14A illustrates schematics of the optical fiber plasmonic waveguide sensor. FIG. 14B is an enlarged view of the nanostructure of FIG. 14A. FIG. 14C illustrates an example of a fabricated sensor nanocircuit 10F on optical fiber with a long interaction length. The sensor can be formed as descried above with deposition of the metal layer 16 and milled to form a waveguide. However, in this nanocircuit, the waveguide is not a throughpath as in other described waveguides but ends prior to exiting the metal layer, as a "dead end". Such an end 46 reflects the energy in the waveguide 30. The invention can use enhanced spontaneous/Raman emission from the emitters at the ENZ region using a TiN/TCO ENZ coated plasmonic slot waveguide on an anoptical fiber tip, shown in FIGS. 14A and 14B. The ENZ thin film can be deposited on the plasmonic slot waveguide on the optical fiber facet using ALD technique, and molecules/emitters can be layered to the facet of the optical fiber. Light 50 can be coupled through the core 6 to excite the plasmonic mode in the plasmonic slot waveguide 30. The propagating plasmonic light can interact with the molecules/emitters in the slot 20 and the emitted light 52 can be coupled back to the core. Raman signal/spectrum can be collected in the reflection of the fiber using a beam splitter. To ensure the sufficient light-matter interaction length while balancing the propagation loss, novel structures with reasonable length, such as spiralling waveguides as shown in FIG. 14C with an circumscribed diameter less than 40 µm, can be fabricated on the fiber core fact with the end 46 of waveguide terminated for stronger light reflection. The measured emission for nanocircuits with and without the ENZ layer will be compared to reveal the ENZ emission enhancement.

Enhanced emission results from the high local density of states near the ENZ surface and the enhancement is highly dependent on the dipole orientation of the emitter being coupled efficiently to the ENZ resonance. A similar coupling scheme in the plasmonic slot waveguide can be used to enhance the photoluminescence and simulated/spontaneous emissions of the emitters (such as. quantum dots, up-conversion nanocrystals, and lasing materials) using the ENZ plasmonic nanocircuits. The demonstrated quantum emission enhancement in optical fiber nanocircuit can lead to advanced on-fiber quantum source and in-fiber Raman sensing applications.

Other and further embodiments utilizing one or more aspects of the inventions described above can be devised without departing from the disclosed invention as defined in the claims. For example, other embodiments can include other shapes and types of optical fibers, other ENZ materials for forming a film on or in an optical fiber, other MOS structures and materials, other thicknesses and frequencies, and other variations than those specifically disclosed above within the scope of the claims.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A nanocircuit device, comprising:
   a first optical fiber formed with a facet; and
   a nanocircuit integrally formed on the facet, the nanocircuit comprising:
      a nanocoupler configured to directly couple light energy from the first optical fiber with plasmonic energy on the nanocircuit; and
      at least one waveguide formed in the nanocircuit and coupled to the nanocoupler, the waveguide configured to conduct plasmonic energy on the nanocircuit.

2. The device of claim 1, wherein the first optical fiber is a multicore fiber configured to provide a plurality of inputs to the nanocircuit.

3. The device of claim 1, further comprising a second output optical fiber coupled to the nanocircuit and configured to receive output from the nanocircuit to emit light energy from the second optical fiber.

4. The device of claim 3, wherein the second optical fiber is a multicore fiber having a plurality of output ports.

5. The device of claim 4, wherein the first optical fiber is a multicore fiber configured to provide a plurality of inputs to the nanocircuit.

6. The device of claim 1, wherein the waveguide is formed in a metal layer and further comprising a dielectric layer deposited on the metal layer and a transparent conducting oxide layer deposited on the dielectric layer and wherein an applied bias changes a resonance of the layers for phase and amplitude modulation in the nanocircuit.

7. The device of claim 1, wherein the nanocircuit comprises an output and an amount of energy from the output is dependent of an electrical bias applied to the nanocircuit.

8. The device of claim 1, wherein the nanocircuit comprises an output and an amount of energy from the output is dependent of a frequency light energy to the nanocircuit.

9. The device of claim 1, wherein the nanocircuit comprises a plurality of waveguides, wherein each waveguide of the plurality of waveguides is formed with an input nanocoupler and an output nanocoupler and the output nanocoupler is configured to emit energy from the waveguide.

10. The device of claim 1, wherein at least one waveguide of the plurality of waveguides has a different length than at least another waveguide of the plurality of waveguides.

11. The device of claim 1, wherein the nanocircuit comprises a directional coupler comprising:
a first waveguide having an input nanocoupler and an output nanocoupler;
a second waveguide having an input nanocoupler and an output nanocoupler, the second waveguide having a length aligned in parallel proximity to a length of the first waveguide that is configured to couple an evanescent field between the first and second waveguides.

12. The device of claim 11, wherein a change in frequency of light energy provided to the input nanocoupler of the first waveguide changes an emission of light energy of the output nanocoupler of the first waveguide compared to the output nanocoupler of the second waveguide.

13. The device of claim 1, wherein the nanocircuit comprises a polarization splitter comprising:
a first waveguide having an input nanocoupler and an output nanocoupler, the input nanocoupler being oriented with a first incident polarization light at a first angle;
a second waveguide having an input nanocoupler and an output nanocoupler, the input nanocoupler being oriented with a second incident polarization light at a second angle;
wherein the first waveguide and the second waveguide conduct different energy levels depending on the polarization angle of the incident polarization light.

14. The device of claim 1, wherein the nanocircuit comprises a resonant guided wave network, comprising:
a plurality of waveguides each having a nanocoupler on each end of the waveguide,
wherein at least one of the nanocouplers is configured as an input nanocoupler to receive light energy from the optical fiber and a plurality of other nanocouplers are configured as output nanocouplers,
wherein the waveguides create multiple resonances due to coherent interference of plasmon waves through the waveguides.

15. The device of claim 14, wherein emission of light energy through the output nanocouplers is dependent on a frequency of incident light to the input nanocoupler.

16. The device of claim 1, wherein the nanocircuit comprises a plasmonic waveguide sensor, wherein:
the at least one waveguide comprises an input nanocoupler and an end, wherein the end reflects plasmonic energy in the waveguide and at least a portion of the reflected plasmonic energy converts to light energy returned to the optical fiber.

17. A method of manufacturing a nanocircuit device, comprising:
providing an optical fiber formed with a facet;
depositing a metal layer on the facet;
milling a slot into the metal layer on the facet configured to form a waveguide; and
milling a nanocoupler into the metal layer on the facet and configured to directly couple light energy from the optical fiber with plasmonic energy in the waveguide.

18. The method of claim 17, further comprising:
depositing a dielectric layer on the metal layer;
depositing a transparent conducting oxide layer on the dielectric layer, wherein an applied bias changes a resonance of the layers for phase and amplitude modulation in the nanocircuits.

19. The method of claim 17, further comprising depositing a transparent conducting oxide layer on the metal layer.

20. The method of claim 17, wherein milling comprises using at least one of focused ion beam processing and electron beam lithography.

* * * * *